(12) United States Patent
Samid

(10) Patent No.: US 10,790,977 B1
(45) Date of Patent: Sep. 29, 2020

(54) SPACEFLIP: UNBOUND GEOMETRY SECURITY

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/855,517

(22) Filed: Apr. 22, 2020

Related U.S. Application Data

(63) Continuation of application No. 16/687,690, filed on Nov. 19, 2019, now Pat. No. 10,673,822.

(60) Provisional application No. 62/688,387, filed on Jun. 22, 2018, provisional application No. 62/689,890, filed on Jun. 26, 2018, provisional application No. 62/714,735, filed on Aug. 5, 2018, provisional application No. 62/805,369, filed on Feb. 14, 2019, provisional application No. 62/813,281, filed on Mar. 4, 2019, provisional application No. 62/782,301, filed on Dec. 19, 2018, provisional application No. 62/850,720, filed on May 21, 2019, provisional application No. 62/857,898, filed on Jun. 6, 2019.

(51) Int. Cl.
  *H04L 9/12* (2006.01)
  *H04L 29/06* (2006.01)
  *H04L 9/08* (2006.01)

(52) U.S. Cl.
  CPC .............. *H04L 9/12* (2013.01); *H04L 9/0891* (2013.01); *H04L 63/0407* (2013.01); *H04L 63/0471* (2013.01)

(58) Field of Classification Search
  CPC .......................................................... H04L 9/12
  See application file for complete search history.

(56) References Cited

U.S. PATENT DOCUMENTS

| | | | | |
|---|---|---|---|---|
| 3,507,980 A | * | 4/1970 | Rugaber | H04K 1/00 380/243 |
| 3,535,439 A | * | 10/1970 | Reiseter | H04N 1/327 358/436 |
| RE28,701 E | * | 1/1976 | Edwards | G06Q 20/3433 235/381 |
| 4,558,176 A | * | 12/1985 | Arnold | G06F 21/10 380/29 |
| 4,979,832 A | * | 12/1990 | Ritter | H04L 9/002 380/28 |
| 5,724,427 A | * | 3/1998 | Reeds, III | H04L 9/065 380/259 |
| 5,740,243 A | * | 4/1998 | Rehm | A63F 3/0421 273/139 |
| 6,125,182 A | * | 9/2000 | Satterfield | H04K 1/06 380/28 |
| 6,823,068 B1 | * | 11/2004 | Samid | H04L 9/0838 380/277 |
| 10,469,259 B1 | * | 11/2019 | Fox | H04L 9/3239 |
| 2017/0193025 A1 | * | 7/2017 | McLellan | G06F 16/2272 |
| 2017/0250796 A1 | * | 8/2017 | Samid | H04L 9/0838 |
| 2019/0394171 A1 | * | 12/2019 | Kaman | H04L 9/12 |

* cited by examiner

*Primary Examiner* — Bradley W Holder

(57) ABSTRACT

A super polyalphabetic cipher where both the alphabet size, and the key size are user controlled and secret, and where computation is kept simple—reading, comparing, and sorting bits, to minimize battery consumption for Internet of Things, and where the users can decide how much randomness to use to match their security needs, and face, when necessary, a quantum computer cryptanalytic assault.

14 Claims, 9 Drawing Sheets

Chain Encryption (a)

(b)

(c)

Figure 11:
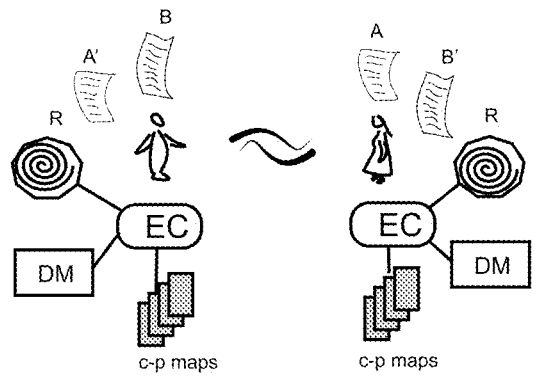

Fig.-1:
LINE in Randomized Space
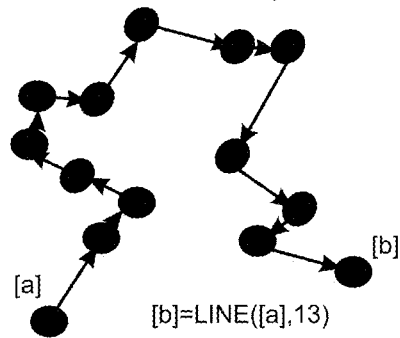
[b]=LINE([a],13)
Fig.-2:
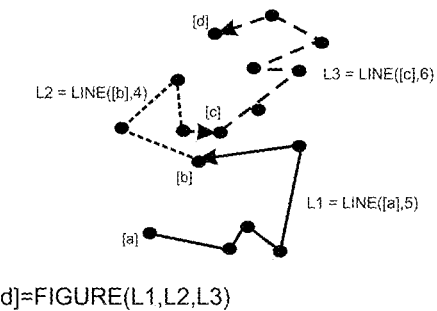
[d]=FIGURE(L1,L2,L3)
Fig.-3: Space Centrality
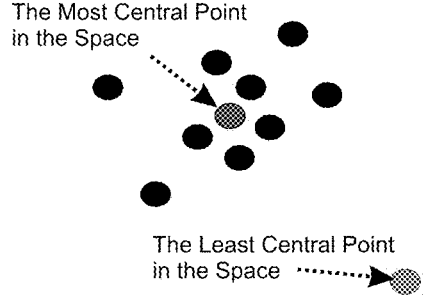

Fig.-4:
Manifold
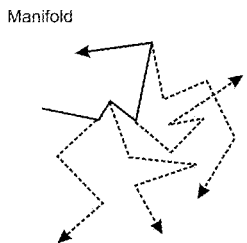
Fig.-5:
A Block [a,b,c] in a Space
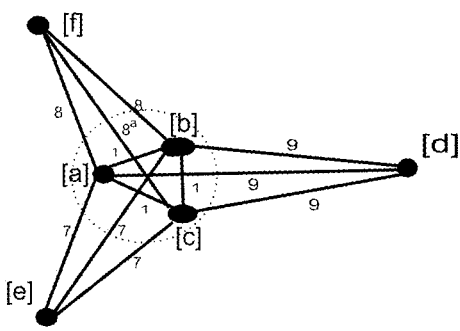
Fig-6:
Defining Subsets in Space
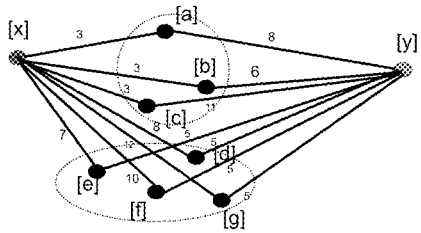
Fig-7:
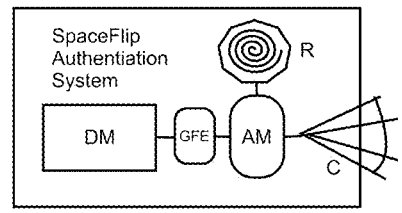
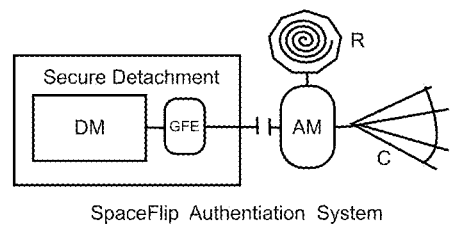
SpaceFlip Authentiation System Fig-8:
Matrix Only
Secure Detachment
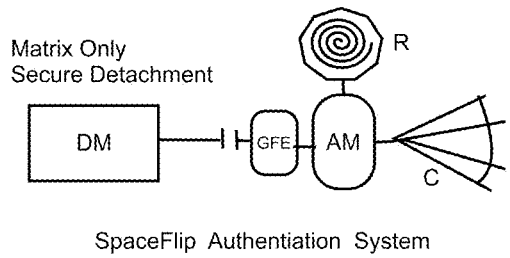
SpaceFlip Authentication System
Fig-9:
SpaceFlip Authentication
Secured Key Resides
in a Personal wearable
S + GFE
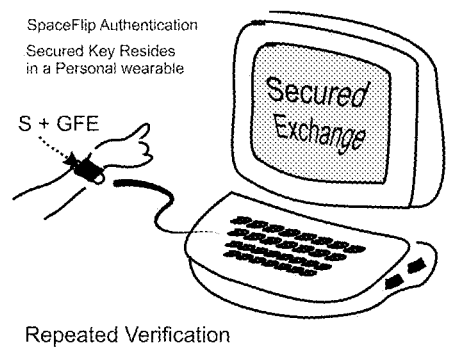
Repeated Verification
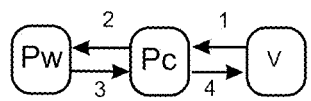
Fig-10:
SpaceFlip Hashing Hierarchy
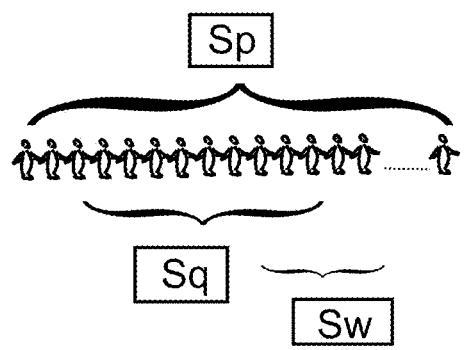

SpaceFlip LINE Encryption

SpaceFlip Encryption Chain Mode

SpaceFlip Cascade

SpaceFlip BEFORE Encryption
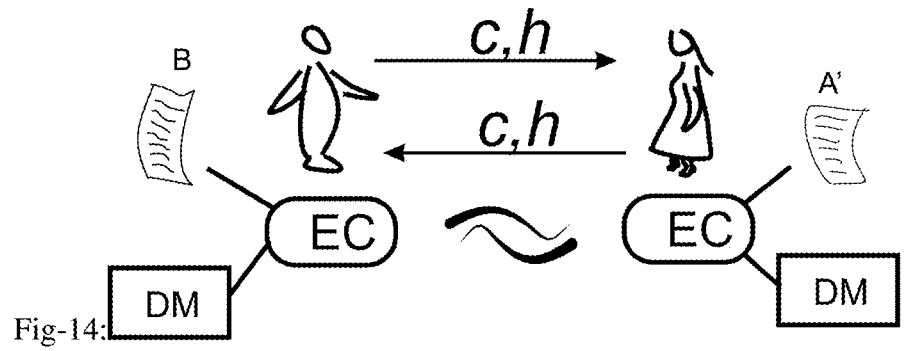
Fig-14:
Fig-15:
LINE with Inflection Point
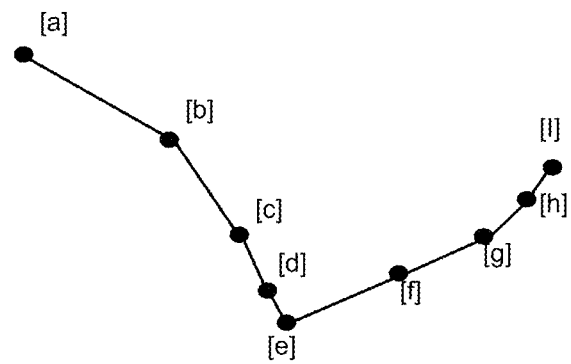
Fig-16:
A THICK LINE
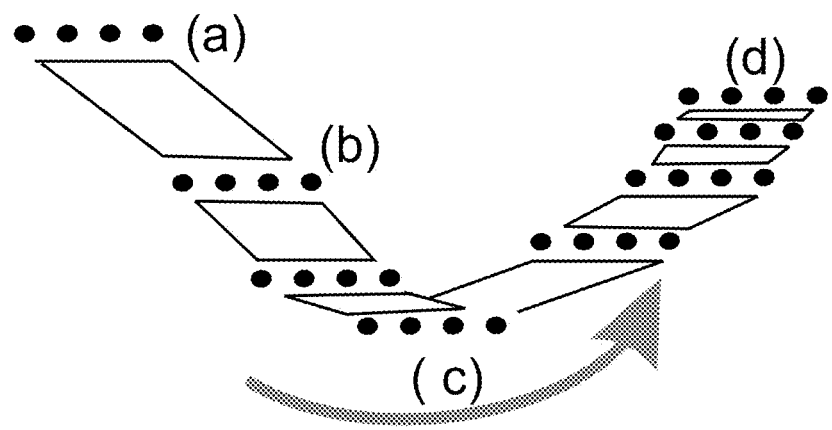

A Thinning LINE

A Broadening LINE

Unbound Geometry

Beyond Metric Spaces

All Distances are Randomized

Unbound Geometry
Breaking Metric and Topological Proximity

Distance between [a] and [b] is independent of distances between these two points and all other points in the space.

Steganographic Shadow

Mapping Continuity to Limited Points Distance Matrix

SpaceFlip Pattern Recognition centrality signature anchor signature

Dimensionality Equivalence of Unbound Geometry $[a,b]^2 = \Delta X^2 + \Delta Y^2 + \Delta Z^2$

SPACEFLIP: UNBOUND GEOMETRY SECURITY

US PATENT APPLICATION SPECIFICATIONS DETAILED DESCRIPTION OF THE INVENTION

Overview: A geometry is a measure of restraint over the allowed 0.5n(n−1) distances between a set of n points (e.g. the "metric" space). So defined geometries lead to associated algebra. The complexities of such algebras are used to build cryptographic primitives. We propose then to push geometries to the limit—unbound geometries—where any two points may be assigned an arbitrary distance value which may reflect a planning process or a randomized assignment. Regarding these distances as a cryptographic key, one could use the resultant algebras to carry out cryptographic missions. We define the mathematical framework for this aim, then present a few cryptographic primitives. The strength of the cipher is determined by the size of the randomized geometry. If we use simple algebra we can make nominal processing to be proportional to the size of the geometry, and thus increase this geometry at will—adjusting security to the level of the perceived threat. We use the term SpaceFlip to collectively refer to the unbound geometry, its associated algebra and the cryptographic tools derived from it.

EXPLANATION OF DRAWINGS (SPACEFLIP)

FIG. 1 LINE in a Randomized Space

The figure depicts the string of points and the corresponding string of distances leading from the anchor point [a] to the end point [b], marked as the 13th point in the line.

FIG. 2: FIGURE

The figure shows FIGURE comprised of 3 consecutive lines: L1, L2, and L3. Line L1 is comprised of 5 points leading from [a] to [b]. Line L2 starts from point [b] and ends with [c]. And line L3 starts with [c] and ends with [d].

FIG. 3 Space Centrality

Depiction of the notion of centrality. The red point is visibly the most central in the set and the green is visibly the most remote (external) in the set. It will also show by their centrality values.

FIG. 4: Manifold

Depiction of a manifold where each pint on the line is an anchor to a different LINE (shown in dotted lines)

FIG. 5 A block 104 in a Space

A depicted space shows points [a],[b],[c] as a block since their mutual distances are the same, and they all have the same distance value to all the points that are not part of the block.

FIG. 6 Defining Subsets in Space

Figures shows two subsets defined over a space shown inside dotted circles. The first [a],[b], and [c] points are a set identified by having the distance "3" from [x] which is the set defining point. The other set is comprised of elements [d],[e],[f],[g] identified by having the same distance "5" from point [y] which is that set defining element.

FIG. 7 SpaceFlip Authentication System

The figure shows the components of the authentication system: DM—the distance matrix, GEF—the geometric evaluation function, AM—the authentication manager, R—the randomness sources, C—the communication module. In the upper depiction all the components are housed in one capsule. In the bottom depiction the DM and GEF can be decoupled from the AM for security purposes.

FIG. 8 Matrix Only Secure Detachment (Space Flip authentication system)

The figures shows the option where only the matrix itself is removable. The rest is integral part of the communicating unit.

FIG. 9 Secured Exchange

The figure shows a computer repeatedly authenticating its user via her electronic watch which contains the space and the geometric function evaluator GFE, responding to the computer challenges. The diagram below shows the verifier, V challenging (1) the prover computer (Pc), which in turn communicates (2) the challenge to the prover watch (Pw), which responds (3) and Pc returns (4) the response to the verifier.

FIG. 10 SpaceFlip Hashing hierarchy

The figure shows a group of communicators using a shared space, Sp to authenticate themselves one to the other. It shows also two partially overlapping subgroups q and w sharing group specific spaces, Sq and Sw respectively to authenticate each other as belonging to a subgroup.

FIG. 11 SpaceFlip line Encryption

The figure shows Alice and Bob using LINE encryption. Each having an encryption controller, EC connected to the shared distance matrix, DM, and each using a randomness source, R. It also shows that each is preparing c-p lists: lists that show per a choice (random choice usually) of a LINE (or a FIGURE) a pre-computed table of which letter of the alphabet per that choice geometric function, when regarded as a ciphertext letter evaluates to which corresponding plaintext letter. Based on this table (per geometric function) Alice and Bob each communicates a sequence of ciphertext letters to the other, along with the definition of the choice geometric function. The recipient uses the communicated function over the communicated ciphertext letter to evaluate the plaintext letter.

Figure 12:
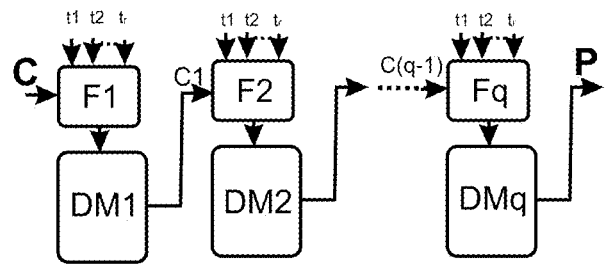

FIG. 12 SpaceFlip Encryption Chain Mode

The figure shows a ciphertext letter, c, is taken by a geometric function evaluator, F1 which is fed by its defining parameters t1, t2, ... tr. F1 is connected to distance space DM1, and resolves the function and the ciphertext to element c1 which in turn is fed to a second geometric function F2, fed with its defining parameters, and operating on a second distance matrix, DM2 to extract c2, which in turn if fed into the next geometric function evaluator, and so on some q time. The last element to emerge from this chain is the plaintext letter.

Figure 13:
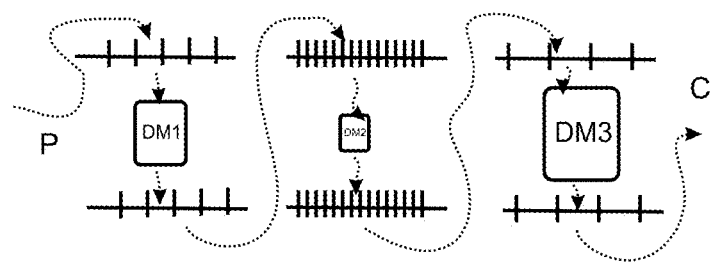

FIG. 13 SpaceFlip Cascade

The figure shows a plaintext stream P being chopped to bit strings that are the size of the letters used in distance matrix DM1. It results in a new, encrypted stream comprised of the concatenated ciphertext letters. The encrypted stream is treated as a plaintext to another round of encryption. The new round, as depicted uses a smaller distance matrix DM2, and hence its letter size (bitwise) is smaller. So now the feed stream is chopped to smaller sections, where each section is encrypted to a same size encrypted section (encrypted letter). The resulting stream is regarded as an input to a third encryption round. The third distance matrix is larger, so its alphabet is larger, and the size of each letter larger too. This guides the chopper to chop the input string to larger piece. The resultant encrypted stream (three rounds) is regarded as the final ciphertext stream.

FIG. 14 SpaceFlip BEFORE Encryption

The figure shows Alice and Bob each using an encryption controller EC module with access to the shared distance matrix, and each sending the other the result of any forward geometric function (e.g. NEXT, Addition) where a plaintext letter served as input and the corresponding ciphertext letter came out as output. When transmitting the ciphertext is sent with the h-integer that identifies the plaintext among the possibly many letters that could be used with same function and produce the ciphertext as output.

FIG. 15: Line With Inflection Point

The figure shows a geometric LINE where the distances are consecutively shorter until the 'deflection point', [e] from where they turn around, the distance [e,f]>[d,e]. That is because the points that are already part of the line [a], [b],[c], and [d] are excluded from being re-listed, and from the remaining points [e,f] is the shortest, yet larger then [d,e]. From the first inflection point the distances one again are consecutively shorter: [f,g]<[e,f], and [g,h]<[f,g] up to the next inflection point, and so on.

FIG. 16 A Thick Line

Figure 17:
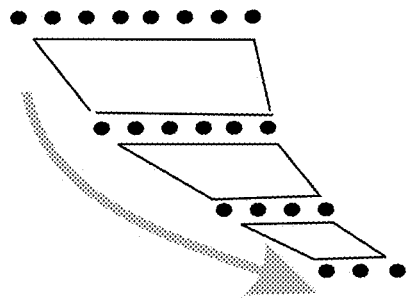

A group of four points (a) serves as an input to a Poly* function that produces a set of different four points (b). Group (b) serves as input to the same Poly* function to produce group (c), which is shown as the "inflection point" namely the group that follows (c) have a "longer distance" from (c) then (c) has from (b). The THICKLINE is analogous to the regular one-point-at-a-time line only that it is thicker FIG. 17 A Thinning Line Operating a Poly* function where v<u (fewer output points than input points) leads to a line that narrows as it runs ahead. Successive 'group points' have less and less members.

Figure 18:
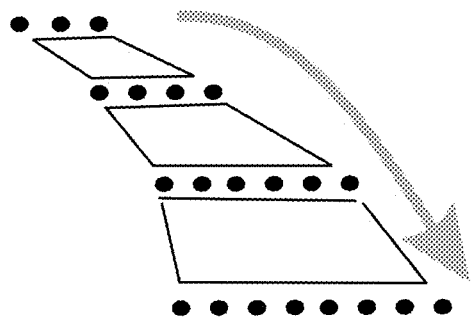

FIG. 18: A broadening Line

Using a Poly * function where v>u (more output points than input points) leads to a LINE which becomes wider as it proceeds, every successive group point has more points in it.

Figure 19:
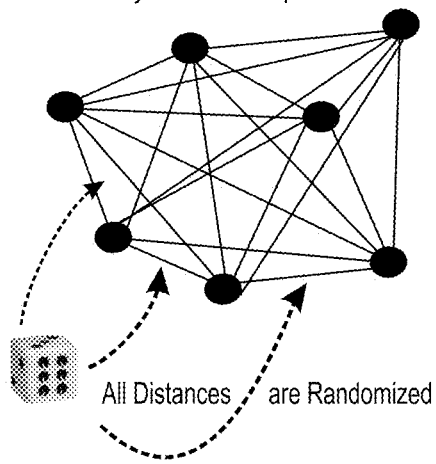

FIG. 19 Unbound Geometry—Beyond Metric Spaces

The figure shows a space comprised of point where all mutual distances are individually randomized, so one distance value is not restricted by any other distance values. It breaks away with the fundamental spatial notion of neighborhood and proximity.

Figure 20:
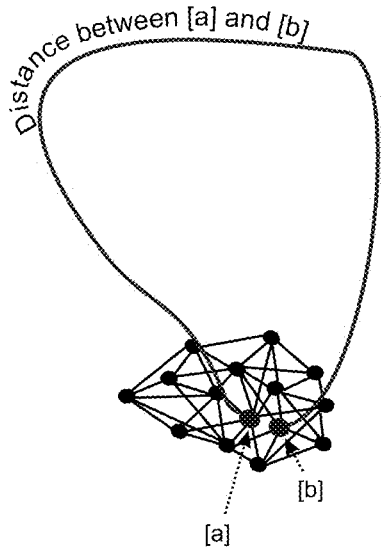

FIG. 20 Unbound Geometry—Breaking Metric and Topological Proximity

The figure illustrates how to points [a] and [b] which have similar distances towards many, or even all other points in the space, do have a very different distance measure between them. This is the unique feature of the Unbound geometry.

Figure 21:
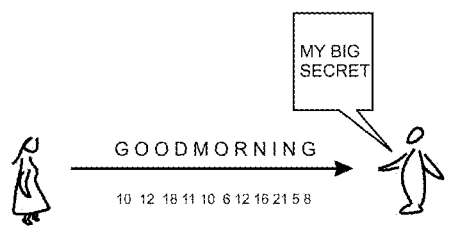

FIG. 21 Steganographic Shadow

An innocent message "Good Morning" is sent from Alice to Bob along with "t-values" which guide Bob to running LINES on the shared space he secretly holds together with Alice. The t-value per letter will tell him at which letter on the line to stop—this is the hidden (shadow) letter that together form a secret message of same length "My Big Secret" which an adversary may not even suspect, let alone decipher. The picture shows how different letters generate different length LINES until they arrive at the hidden message letter.

Figure 22:
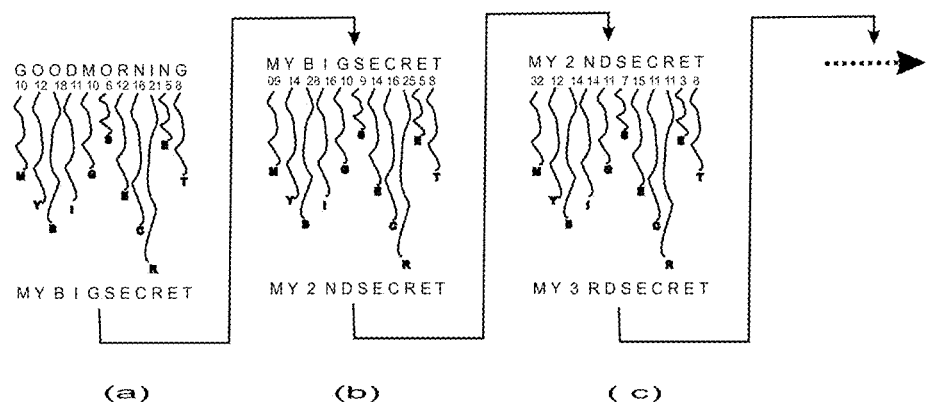

FIG. 22 Chain Encryption

A plaintext message "Good Morning" is encrypted through one space by a set of 't-values'. The deciphered message "My Big Secret" then serves as input string to encrypt a second message, and the new secret message serves as input to the next message and so on. What passes in the open is only the t-values (except for the 1st round). This insure communication continuity between successive sessions and prevents breaking in hackers.

Figure 23:
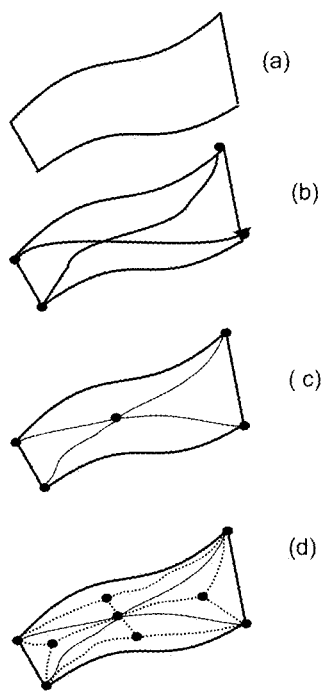

FIG. 23 Mapping Continuity to Limited Points Distance Matrix

Some well defined area in a multi dimensional space (a) is first marked by 4 points with maximum mutual distances among them (b). Next one identifies a center point such that it is most central relative to the points in (a), that means lowest centrality metric. (c). This defines 4 'triangles'. Each triangle then identifies its own center point—the point that is most central relative to the three points of the triangle (d). These central points now parcel each triangle to three triangles, where the process repeats until one reaches the number of points with which one decides to capture the original area (a). This is a way to capture a continuum of any dimensionality with a distance matrix of a desired size.

Figure 24:
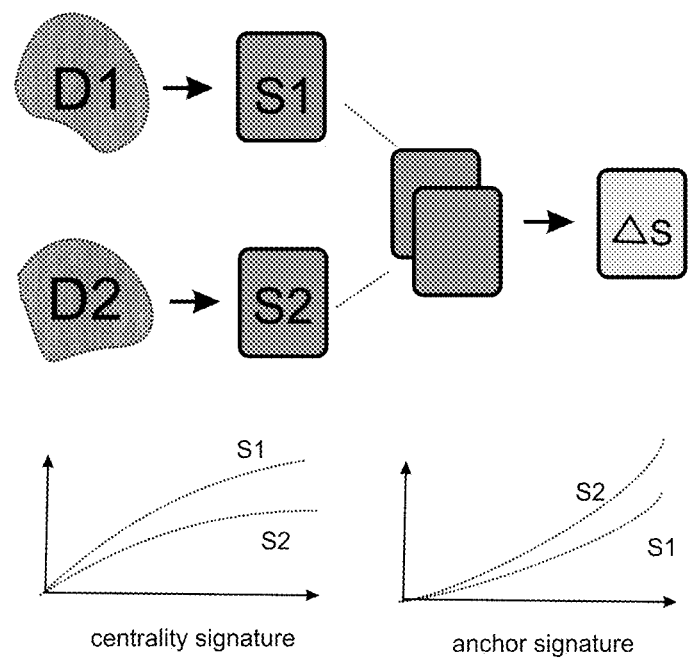

FIG. 24 SpaceFlip Pattern Recognition

Two bodies of data D1 and D2 are approximated as distance matrices S1 and S2 respectively. The two same size matrices are subtracted to each other to form the $\Delta S$ matrix. The more uniform $\Delta S$, the more similar S1 and S2 and hence the more similar D1 and D2. The figure also shows how the two matrices are compared by centrality signature and by anchor signature.

Figure 25:
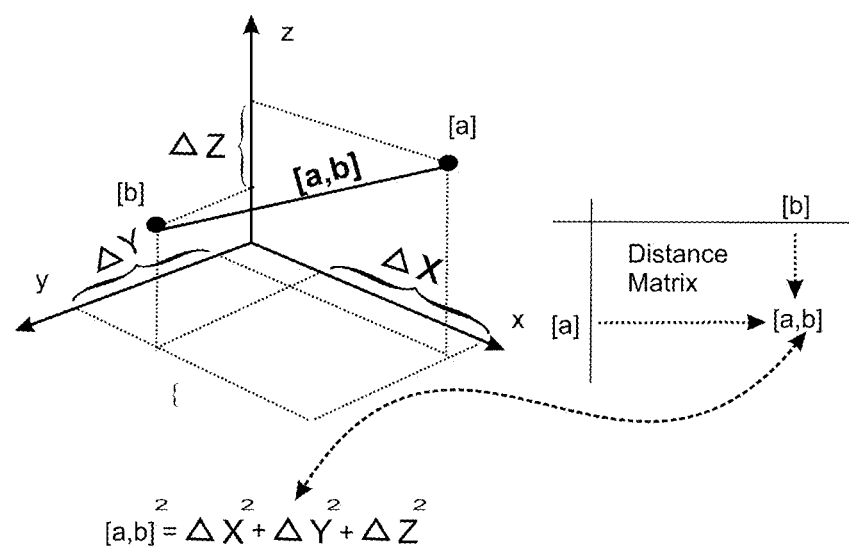

FIG. 25: Dimensionality Equivalence of Unbound Geometry

Two points [a] and [b] are shown on a three dimensional space. Their mutual distance is measured in the Euclidean way by adding the squares of the differences between the points on each of the three dimensions. That distance value is then entered into the respective distance matrix where no dimensions appear. By properly setting the relative scales of the three dimension, X, Y, and Z the computed distance [a,b] will be unequivocally be reversed to $\Delta X$, and $\Delta Y$ and $\Delta Z$ between the two points. This will accomplish a one to one mapping of the normal dimensionality space to the distance matrix, the SpaceFlip space.

INTRODUCTION

The history of mathematics and science is one where geometry and algebra exchanged complexities back and forth (e.g. analytic geometry, trigonometry, log-charts, Laplace transforms). We investigate the extreme end of this interchange: investing maximum complexity in the geometry while simplifying the algebra. The cryptographic aspect of this shift is to build security through large as needed shared "keys" processed with fast, simple computation. The simpler the computation, the smaller the chance for a hidden mathematical flaw to enable a cryptanalytic compromise, and the smaller the power consumption (critical for IoT applications). With the emerging technologies for robust sources of shared quantum grade randomness, see "the rock of randomness" this shift appears to deserve our interest.

By investing security in the size of the applicable randomness one establishes a "moving security needle" that can be shifted up to perfect "Vernam" security, when warranted. By keeping the size of the "key" as part of the key secrecy, the user denies its cryptanalyst the ability to credibly appraise the required cryptanalytic effort. A very important security advantage.

The cryptographic products presented here are kindred spirits to former ciphers like "Walk in the Park" (Equivoe-G [9]), and "Equivoe-T" [6,7,8], and BitFlip [1,2]. They all use simple computation over a flexible size shared and unilateral randomness. The presentation here hinges on the more abstract idea of removing as many restrictions as possible over the underlying geometry—Unbound Geometry.

We use the name SpaceFlip to refer collectively to the unbound geometry, the associated algebra and the derived cryptographic tools.

The Larger Framework

Observing the role of inertia in the progress of mathematics and science, one is driven to look back into the trajectory of progress, and explore for "side branches" that have been overlooked.

Such attention was given to the notion of space and geometry. For centuries the Euclidean framework guided science, math and technology. It took a while for curved spaces to emerge and become tools for analysis and science, and then mathematicians moved ahead by generalizing metric spaces through topological spaces. This move advanced the notion of a positive real number distance value between elements (points) of a space, with joined and intersected sets and 'neighborhoods'. Thereby one abstracted the notion of distance, alas it retained the more general notion of proximity. David Hilbert in "Foundations of Geometry" (1899) abstracted proximity to 'in-betweenness', constituting geometry on axioms like: "If four points are given on a line, they can always be denoted by A, B, C and D in such a way that B lies between A and C, and also between A and D, and C lies between A and D and also between B and D".

Is there any benefit to be found in challenging "in-betweenness", "neighborhood" and "proximity"? Or say, is it worthwhile un-bounding metric spaces? What about rendering the exact distances between the points of a space into the critical element of the space, and in particular allowing the distance between any two points of the space to assume any arbitrary value. That means to decouple the distance between two points in the space from being restricted or bounded in any way by any other distance value, even between the same two points and all other points in the space. Such "free roaming" distance values may be set according to some plan, or may be set in a random fashion.

In Unbound Geometry a collection of n points in a space may have $0.5n(n-1)-1$ distances all of the same approximate values (neighbors), while the distance between any two particular points in this collection could be way different, say much larger, such that these two points are not neighbors. Yet, we revisit the notion of proximity and carve out a universal metric thereto (centrality mapping)

Such thinking seems consistent with the need of modern physics to randomize space in order to reconcile between general relativity that calls for shaping space according to the matter inside, together with quantum mechanics that replaces the notion of strict locality for matter with a location probability function.

Another observed trend is dimensionality. Our daily experience is interpreted over a three dimensional spatial space. Mathematicians extended it to four and more dimensions, which cannot be humanly imagined, but can be formally captured as a mathematical construct. The question arises— is dimensionality fundamental? Can one capture the richness of a multi dimensional space via a space where proximity is not honored, and the restriction on triangular distances (the hallmark of a metric space) will be dishonored? The idea being to start with the most unbound geometry conceivable, and then build up restrictions as one uses the geometry for mathematical expressions.

The algebra that describes a dynamics over a space will naturally change as the space is recast. So the question arises: how to optimize the description of the underlying geometry to make the computational efforts more efficient? Bad definition of a geometry will complicate the math, the computation. A good geometric foundation would simplify the computation. This may be a guiding question for a promising investigation.

All this leads to an intriguing question: missing laws or missing geometry? Our natural disposition was to assume the visible space as given, and then search for 'natural laws' that govern the dynamics therein. One could also assume that the geometry we use as framework for reality is a subset of what there is. We see only part of the points that weave space. Searching for the missing elements and the distances that define them may be very adventurous and productive.

Herein the practical emphasis of the unbound geometry, or say the SpaceFlip technology, is cryptography, but that may turn out to be a marginal application.

Mathematical Constructs

Natural numbers are commonly interpreted as points arrayed on a straight line placed with a fixed interval (1) between any two consecutive numbers. This defines a distance $[i,j]=|i-j|$ between two natural numbers i and j. This configuration may be written as an n×n matrix referring to integers 1, 2, ... n, where the cells of the matrix are the distances $[i,j]$, i,j=1, ... n. It shall be called the straight line distance matrix (SLDM). The integers 1, 2, ... n will be called the reference set and marked [1], [2], ... [n]

For n=5 we have

| space 1: | | | | | |
|---|---|---|---|---|---|
| | [1] | [2] | [3] | [4] | [5] |
| [1] | 0 | 1 | 2 | 3 | 4 |
| [2] | 1 | 0 | 1 | 2 | 3 |
| [3] | 2 | 1 | 0 | 1 | 2 |
| [4] | 3 | 2 | 1 | 0 | 1 |
| [5] | 4 | 3 | 2 | 1 | 0 |

We may regard the 'straight line distance matrix' (SLDM) as the construct that maps the positive integers through a particular mutual distance relationship. In other words. the integers labeled as [1], [2], ... are a-priori any set of distinct entities, and their 'integer characteristics' is defined by the matrix populated by a-priori integers.

We usually use the term 'points' to refer to the elements over which a geometry (a space) is defined. An Euclidean point has an elusive definition of an entity devoid of dimensionality. We may choose to bypass the definition of the point, and simply relate to it as some entity with a specific label. So we envision a set of points we regard as the space reference set. The elements of the set (the 'points') are defined only via their mutual distances.

Commonly we deal with Euclidean geometries, and then with non-Euclidean geometries, mostly with metric spaces where we require that for any three points any of the three distances will be equal or less of the sum of the two other distances. We now investigate an extension of these restricted geometries, into unrestricted—unbound—spaces allowing the $q=0.5n(n-1)$ distances between the n points of the space to take any value.

We do keep the first three terms of a metric space: (i) the distance between a point and itself is zero, (ii) the distance between any two points is a positive value, and (iii) the distance from one point to another is the same as the distance from the other point to the first point.

Every two elements in the reference set (the set of points in the space) will have a mutual distance in the form of a positive integer. In particular we regard a reference set of n elements: [1], [2], ... [n] situated as a "graph", "geometry"

or a "space" (alternate terms) where the distance between any two element [i] and [j], written as [i,j] can assume any arbitrary value between any small positive integer, and any high positive integer. The distance may be a result of a planned scheme, or a randomized selection. Note: ahead we will walk back a bit the 'unbound' claim and levy some minimal conditions.

For convenience we arrange the q(n) integers (representing distances) in an n×n matrix, where both the columns and the rows represent the n elements of the reference set: [1], [2], [3], . . . . Note that the numbers in the square bracket are used for distinction, they don't represent value. In other words, the expression [i]>[j] is meaningless. We refer to this matrix as the 'universal distance matrix', 'UDM', 'distance matrix', 'the space matrix', or alternatively, the 'universal space matrix'.

| The Space Matrix: | | | |
| --- | --- | --- | --- |
| | [1] | [2] | [3] |
| [1] | 0 | [1,2] | [1,3] |
| [2] | [1,2] | 0 | [2,3] |
| [3] | [1,3] | [2,3] | 0 |

The matrix defines each member of the reference set in terms of all other elements. Elements are identified by a unique label, and don't have to be identified any further as to their nature or content.

Inspired by the straight-line distance matrix, which defines an order within its elements, we may wish also to carve an order in the 'space'.

Since the distances are arbitrary, the unbound-geometry space, or 'unbound space' lacks a natural sense of 'origin' and 'direction'. In the familiar metric spaces we can mark the 'next point'. Our attempt then is to import these notions of origin and next to the unbound space. We will see ahead the concepts of 'anchor' and 'centrality' with which to simulate the notion of the origin of the space. And we see ahead how we simulate the notion of 'the next point' by defining it as the point that is the closest to the point for which we seek the 'next point'. Each point in the space has a closest point, so every point has a next (same low distance issues are duly resolved). This is akin to the familiar spaces which are either infinite or 'closed'.

Introducing the geometric function 'NEXT'. NEXT will map any element [i] to an element [j]≠[i], written as: [j]=NEXT[i].

For any arbitrary element, [i], we define [j]=Simple-NEXT([i])=sNEXT([i]), as the element [j]≠[i] such that the distance between [i] and [j] is the smallest. Namely $[i,j]_{min}$: [i,j]≤[i,k] for k=1,2, (i−1),(i+1), . . . n Since the distances may be arbitrary integers it may happen that two or more elements (also called points or dots) of the reference set would share the same minimum distance. In that case we will need to invoke a "NEXT equivocation resolution" (NER) procedure to select the 'proper next' element. We shall discuss the next equivocation resolution (NER) later. At this point we shall assume that one exists, and for any space of n elements, (the reference set) defined over any arbitrary set of mutual distances, every point has a well defined simple-NEXT point in the same space. Here we refer to reference set plus the distance matrix as 'space' but this convenience does not create confusion. When we write NEXT, we will imply simple-NEXT.

Since every element has a NEXT element, we can write an infinite sequence of elements of any finite space (with repeats of course), where every element is followed by its NEXT. Much as it is with integers: [i][j][k][l] . . . . We will refer to such a sequence as a STROKE. We write:

[j]=STROKE([i],t)

to say: when the NEXT function is applied to [i], and then again on NEXT([i]), and so on t times, it points to element [j]. In parallel (and without confusion) the expression STROKE([i],t) will also refer to sequence of elements leading from [i] to [j].

In the special case of the 'straight line matrix' the STROKE will be the normal sequence [i][i+1][i+2] . . . for every element [i].

The STROKE may happen to be circular [i][j] . . . [k][i][j] . . . [k] . . . . So it will not be a good abstraction of the common notion of a simple line. We therefore define the LINE function:

[j]=LINE([i],t)

As a sequence of t elements with the [i] as the first element, and [j] as the last (t-th) element. We require for a LINE to be free of 'circular sections', namely no repeat. Every element that appears once in the LINE sequence cannot appear again.

To achieve this 'non-repeat' attribute we will modify the NEXT function such that it would point to the element which is the 'closest' (smallest distance) from the "pre-NEXT" element, as identified among the elements of the reference set that have not yet appeared in the Line. With this modification of the NEXT function, a LINE will extend from every element in the reference set and eventually contain all the elements in the reference set in some order (some well defined permutation of the n elements). This is because, as long as there are elements that have not yet been listed in the LINE, then another element will be added to the line through the modified NEXT function. This process will only stop when the entire reference set is listed in some order in the LINE.

We can say then that LINE(N) is a well defined permutation of the reference set. We write:

[j]=LINE([i],t)

to say that when one draws a LINE from element [i], and identifies in it t elements, then the t-th element is [j]. The expression LINE([i],t) will also indicate the sequence itself. The value of t represents the length of the line, and is regarded as "length".

Any point will qualify as the starting point of a LINE. The prevailing distances among the n points will determine the next point, then the next, and so on until the line is comprised of all the n points, each listed once and all points listed.

By this definition a given space, "S" (a set of 0.5n(n−1) distances between the elements of the reference set N) together with any element [i] ∈ N define a unique permutation of the elements of N.

Let the points of a given line L be: $[l_1], [l_2], \ldots [l_t]$. We define the length of L as the sum of the distances between the ordered points:

$[L]=\Sigma[l_i, l_{i+1}]$ for $i=1,2,3, \ldots (t-1)$

Illustration: consider the following distance matrix over a reference set of 5 elements:

Space - 2:

|     | [1] | [2] | [3] | [4] | [5] |
|-----|-----|-----|-----|-----|-----|
| [1] | 0   | 1   | 2   | 3   | 4   |
| [2] | 1   | 0   | 5   | 6   | 7   |
| [3] | 2   | 5   | 0   | 8   | 9   |
| [4] | 3   | 6   | 8   | 0   | 10  |
| [5] | 4   | 7   | 9   | 10  | 0   |

We specify a simple line L comprised of 3 elements, starting with [2]. Element [1] has the shortest distance towards element [2]: ([1,2]=1, so we write L=[2][1] . . . . Element [2] is closest to element [1] but since element [2] is already listed in L, it does not count. Next in proximity is element [3], so we write L=[2][1][3]. The length of L: |L|=[2,1]+[1,3]=1+2=3

We can also specify a line, L', beginning with element [5] and extending over the reference set N. Element [1] is the closest to [5] so L'=[5][1] . . . [1] is closest to [2] so: L'=[5][1][2] . . . [2] is closest to [1] but [1] is already listed in L' so it is excluded. Next closest is [3], so: L'=[5][1][2][3] . . . [3] is closest to [1] and [2] but both are excluded so L'=[5][1][2][3][4], a specific permutation of the five elements of the reference set. We write: |L'|=[5,1]+[1,2]+[2,3]+[3,4]=4+1+5+8=18

We can check the impact of populating the distance matrix differently: let's shift around the distances. We shift-right two spots the distances above the diagonal and shift-down two spots the distances below the diagonal:

Space - 3

|     | [1] | [2] | [3] | [4] | [5] |
|-----|-----|-----|-----|-----|-----|
| [1] | 0   | 3   | 4   | 1   | 2   |
| [2] | 3   | 0   | 6   | 7   | 5   |
| [3] | 4   | 6   | 0   | 8   | 9   |
| [4] | 1   | 7   | 8   | 0   | 10  |
| [5] | 2   | 5   | 9   | 10  | 0   |

We now check the line starting with the same [2] as before. The next element is [1]. But the next element is [4], not [3]. So we write L([2],3)=[2][1][4] and |L([2],3)|=[2,1]+[1,4]=3+1=4. And L'([5],5)=[5][1][4][2][3]. So: |L'[5],5)|=[5,1]+[1,4]+[4,2]+[2,3]=2+1+7+6=16

We push forward the abstraction process and define a FIGURE as a set of LINEs We will distinguish between a simple-FIGURE and a complex-FIGURE. A simple FIGURE is straight sequence of LINES, where the end point of one LINE serves as the starting point of the next line. When we write FIGURE we refer to a simple-FIGURE. We write:

FIGURE=([i],$t_1,t_2, \ldots t_r$)=LINE([i],$t_1$)||LINE([*],$t_2$)|| . . . ||LINE([*],$t_r$)

To read: FIGURE defined by a LINE starting point [i], stretching over $t_i$ elements, and ending with element [$i_2$], followed by a second line defined as LINE starting with point [$i_2$] and stretching over $t_2$ elements, followed by a third line, etc, and the (r−1)-th line ends up with point [$i_{r-1}$], followed by the r-th LINE starting with point [$i_{r-1}$], stretching over $t_r$ points and ending up with element [$i_r$]. We also write:

[$i_r$]=FIGURE([i],$t_1,t_2, \ldots ,t_r$)

Notice that a FIGURE can intersect itself many times because the no-intersection condition applies only to individual line segments.

A complex-FIGURE will allow a LINE to emerge from an in-between point on a line.

We now define a MANIFOLD as a complex-FIGURE comprised of a 'first line', $LINE_1$ of length $t_1$ points, where from its second, third, etc. points (to the last) there extends a LINE of some length. So a MANIFOLD is comprised of $t_1+1$ LINEs.

The NEXT Equivocation Resolution (NER)

We now elaborate on the 'next equivocation resolutions (NER). A simple way to insure that no equivocation will incur, is to use consecutive distance values: 1, 2, 3, . . . 0.5n(n−1). These distances can be placed in the distance matrix in 0.5n(n−1)! ways, and they will insure that there will be only one element qualifying as a proper 'NEXT' element for every element in the reference set. This fact will be valid for a normal NEXT and for a LINE-modified NEXT. We regard such spaces as 'consecutive spaces'.

In the general case where the distances are purely randomized, equivocation may occur. It will be resolved as follows. Let $p_1, p_2, \ldots p_t$ be t>1 candidates for being designated as the NEXT element to some element x in the reference set N. Let $p'_1, p'_2, \ldots p'_t$ be one of the NEXT candidates for $p_1, p_2, \ldots p_t$ respectively. $p_i$ will be the designated next element for x, if and only if $[p_i, p'_i]_{min}$—namely the distance between $p_i$ and its NEXT element is the shortest. If equivocation presents itself in the resolving elements then it is resolved iteratively, as many times as necessary.

There are situations when this procedure will not resolve the question of the identity of the NEXT element. For example, when all the q=0.5n(n−1) distances are the same [i,j]=[k,l] for all combinations of i, j, k, l=1, 2, . . . n where i≠j, k≠l. This uniform distance matrix will be excluded from consideration. Ahead we look into "space categories" and define spaces where the NEXT element is always resolved.

Additional NEXT Functions

The simple-NEXT function can be replaced by remote-NEXT function where the next element for some element x, is symmetrically determined by the element of the longest distance from x. The respective LINE and FIGURE will be adjusted accordingly. And similarly for some complex combination of simple-NEXT and remote-NEXT Distance Randomization Options Let r be the number of distinct distance values in a space. 1≤r≤0.5n(n−1). The lower the r value, the more effort is expected in the computation of the NEXT function because of increased equivocation.

The Concept of Anchor

We have seen that any element in the reference set may be the first point of a LINE that will include all the elements of the set in some particular order determined by the distance matrix. This implies that by arbitrarily selecting any element of the reference set as a so called "anchor", we also determine a particular order for the entire set. Every element of the set will have its place in the order. The anchor element is in place 1, its NEXT element in place 2, etc.

By selecting an anchor we identify a set-wide order which we can then apply to resolve any equivocation over the determination of a NEXT element or the resolution of any other geometric function for the same reference set over a different distance matrix. A reference set may be first defined over, say, a consecutive state, S', so that an element [i] therein will identify a permutation of the entire set (through the LINE function with [i] as the first element). And this order will be used to resolve a NEXT function over any other space, S, which may be fully randomized. Whenever several elements of the reference set are candidates for some particular NEXT element, then this equivocation is resolved by selecting the element which is ahead of all the other candidates in the permutation defined over the same reference set with the consecutive distance matrix S'. In other words we have further flexibility to assign a different distance matrix over the same reference set, just for the purpose of determination of order.

Natural Anchor

Given a space, one could let its distance matrix point to a 'natural anchor' defined as follows: For each element [i] in a reference set N where |N|=n, let $t_j$ be the integer for which [i]=LINE([j],$t_j$). We define the 'rank' of [i] in the space as:

RANK([i])=Σ$t_j$ . . . for j=1,2, . . . n

The element [i] with the smallest RANK will be the anchor of the space (RANK([i])$_{min}$)—alternatively the maximum rank. If there is more than one element with the minimum rank, then these competing elements are discarded and the selection is carried out among the remaining elements—which among them has the lowest rank. This step can be applied iteratively, until an un-equivocated element is emerging as the 'natural anchor' of the space. There is small chance that a randomized space will end up with some remaining elements such that all of them share the minimum RANK value. We regard such space as a 'persistent uniformity space' for which no natural anchor may be defined.
Anatomy of LINEs: "Inflection Points", "BEFORE"

Let us apply an index notation to elements of a line. The starting element will be [$x_1$], its NEXT element will be [$x_2$], and so on [$x_{1+i}$]=NEXT($x_i$). The last element in the LINE is [$x_n$] where n is the number of elements in the space. This x-series represents a particular permutation of the n elements of the space.

(n−1) distances are defined by the LINE: [1,2], [2,3], . . . [(n−1),n].

We examine now the relationship between consecutive distances: [(i−1),i] v. [i,(i+1)] where the index i is counted over the x-series.

From a given starting element [$x_1$] we may construct both a STROKE and a LINE. Let [$x_m$] be the last element where the sequence of the STROKE and the sequence of the LINE coincide. This means that [$x_{m+1}$] will be the first element on the LINE that is different from the (m+1) element in the STROKE. We will designate [$x_m$] as the first "inflection point" of the line. We write:

[$x_m$,$x_{m+1}$]≥[$x_{n-1}$,$x_m$]==λ,

Lemma (i): for i=1, 2, . . . (m−1): [$x_{i-1}$, $x_i$]≥[$x_i$, $x_{i+1}$]. Proof: if the lemma inequality had been violated then [$x_i$] would not qualify as [$x_i$]=NEXT([$x_{i-1}$]), since the fact that [$x_{i-1}$, $x_i$]≤[$x_{i+1}$] will require that [$x_{i-1}$]=[$x_{i+1}$], which is not the case for i≤m because the first m elements are part of a LINE where there is no repetition. This implies that for i<m the lemma inequality holds.

Following the first inflection point, there may be more inflection points λ', λ" . . . .

We have seen that given [$x_1$] the identity of [$x_m$] is fully determined based on the space that configures the respective reference set. Albeit, one may encounter equivocation on the way back. In other words, let the function BEFORE be defined as the reverse of NEXT, namely:

BEFORE(NEXT[i])=[i] . . . for i=1,2, . . . n

For all n elements in the reference set.
While we can write: [$x_{i-1}$]=BEFORE([$x_i$]) for i=1, 2, . . . m the identity of $x_{i-1}$ is not algorithmically computable from $x_i$. That is because there may be a different element [y] such that [$x_i$,y]≤[$x_i$, $x_{i-1}$].

In order to identify as the BEFORE of $x_i$ one needs to identify how many elements y, y', y" will qualify as the BEFORE[$x_i$], and then single out $x_{i-1}$ among them. We see ahead how we can use 'consecutive spaces' or 'centrality mappable spaces' to secure a full ranking of any set of elements. In such ranking $x_{i-1}$ will be designated as the $h_i$ ranked element. Based on such ranking we can write:

[$x_{i-1}$]=BEFORE([$x_i$],$h_i$)

And thereby remove all equivocation, and define BEFORE as a precise algorithm. We can iterate as follows:

[$x_j$]=BEFORE([$x_i$],$h_i$,$h_{i-1}$, . . . $h_{j+1}$)

where the number of ranking indicators (i-j): $h_i$, $h_{i-1}$, . . . $h_{j+1}$ will indicate how many steps back to take—how many times one needs to reverse the NEXT function.

Note that this BEFORE function is only applicable over i=1, 2, . . . m (until the first inflection point). Beyond that the choice of NEXT and BEFORE depends on the identities of [$x_1$], [$x_1$] . . . [$x_m$].
Space Categories The underlying idea of the Unbound Geometry is the 'freedom' to assign any integer value to any distance between any two points of the space. We can categorize this 'freedom' to its two extremes: "non-repeat" and "maximum repeat" options. The former will be the case where no two distance values are the same. Namely for a reference setN= {[1], [2], . . . [n]} we have [i,j]≠[i,k] for any i, j, k=1, 2, . . . n where i≠j, j≠k, i≠k. For example the q=0.5n(n−1) distances may be 1, 2, 3, . . . q which can be organized in q! permutations.

The "maximum repeat" option is the case of a 'uniform distance' where for the set above we have: [i,j]=[i,k] for any i, j, k=1, 2, . . . n where i≠j, j≠k, i≠k. In the uniform case there is no distinction between the elements of the reference set, it's not very productive for mathematical purposes. Next is the binary case, allowing for $2^q$ possible spaces.

Looking into the question of distance values for a space, we may aspire to a situation where a distinction can be established for every element (point) in the space. Consider two elements [i] and [j] such that [i,k]=[j,k] for every k=1, 2, . . . n where k≠i and k≠j. Since the distances are the only means to distinguish and characterize elements, we must conclude that in that case elements [i] and [j] are indistinguishable, regardless of the distance [i,j].

We will define a space with no indistinguishable points as a "Fully Evolved Space".
Centrality We define the 'centrality' of a point in a space as the sum total of its distances from all other (n−1) points:

C([i])=Σ[i,j] . . . for j=1,2, . . . ,n

The smaller the value of C, the more central the point.
Let S be a space where the centrality values of all the points are distinct. Namely: C([i])≠C([j]) for all i≠j, i,j=1, 2, . . . n. Then points of S then will be 'mappable' into a 'centrality sequence' listing all the points from the most central to the least central (the most external). We regard such a space as 'centrality mapable'.

Lemma (ii): a space may be fully evolved and not be centrality mapable. Proof: Let points [i] and [j] in a space be the only indistinguishable points therein. By definition we have their centrality equal: C([i])=C([j]). Let [a] and [b] be two additional points in the space [a]≠[b], [a],[b]≠[i], [a], [b]≠[j]. And we further require that the distance between [i] and [a] is different from the distance between [i] and [b]: [i,a]≠[i.b]. Let us now switch between the distances and assign [i,a] to [i,b] and assign [i,b] to [i,a]. By so doing we make [i] and [j] distinguishable, but we keep their respective centralities the same: C([i])=C([j]). So we have constructed a space which is fully evolved but not centrality mapable.

Lemma (iii): a centrality mapable space is always a fully evolved space. Proof: Let S be a centrality mapable space which is not fully evolved. That means that there are at least two elements [i] and [j] which are indistinguishable. Then by definition their centrality values will be the same: C([i])=C ([j]), which contradicts the assumption that S is centrality mapable.

We can now define a 'partially mapable space' as a space S of n points, where there are only 1≤m<n distinct centrality values. The ratio (m−1)/(n−1) will identify the centrality distinction, $C_d$, of the space S for n>1, where $C_d$=0 is the case of 'zero centrality distinction' and the case of $C_d$=1 is the case of fully centrality mapable space.

'Generalized' Proximity

Unbound space wrecks havoc on the traditional notion of proximity. In metric and topological spaces if 0.5n(n−1)−1 mutual distances between n elements of a subset of n points, are of similar value, then the remaining distance between two points [i] and [j] within this set, is also of a similar value. But not so in an unbound space where [i,j] can assume any value, as different as desired from the other mutual distances in the set.

Proximity in unbound spaces is not lost though. The difference in centrality values between two points in the space may be interpreted as the measure of their mutual proximity. This proximity is generalized, in the sense that its value depends on the distances between the two compared points and all other points in the space.

Centrality Mapable Spaces

Since a fully evolved space is also a Centrality Mapable Space (CMS). Hence a space with distance values: 1, 2, 3, . . . q, where q=0.5n(n−1) over n elements in a reference set N, will be both fully evolved and centrality mapable space. We use the positive integer r to measure the number of distinct distance values in a space. In the foregoing case r=q. This is known as a 'consecutive space'.

In the opposite end we have the uniform case (r=1) where all the distances in the space are of the same value. We regarded this as case where the elements of the reference set are indistinguishable and the whole set is one block. A uniform space is clearly not CMS.

Next is the binary case (r=2) where in a randomized option about 0.5 q distances will be an integer α and about 0.5 q distances will be an integer β≠α. There are $r^q$ distinct spaces of that nature. We will show now (lemma (iv)) that a binary distance space cannot be centrality mapped. Three distinct distance values, α, β and γ are needed to build a centrality mappable space. Or say for Centrality mapped space we must have r≥3.

We try first to populate the n columns in the distance matrix with strings of α and β such that no two columns will have the same number β distances—to insure mapability. To do so we start by populating the columns from the first location down to the last position. The other distances will be determined because each distance appears twice in the matrix. The first column has (n−1) distances to be determined. We set them all to α. The next column has (n−2) distances to be determined. They must contain one β (so that column 2 is not identical to column 1). The 3rd column must contain 2 β values, and so on until column n/2 for an even n and column (n+1)/2 for an odd n. The next columns cannot be distinct. We can continue with populating the next columns with the value γ from the bottom, each column incrementing the number of γ distances, until the matrix is full. With this construction we show that three distinct values (r=3) are needed to construct a centrality mapped space.

See illustration where α=1, β=2, γ=5

We try to use two distances and get stopped at column 3:

|     | [1] | [2] | [3] | [4] | [5] | [6] |
| --- | --- | --- | --- | --- | --- | --- |
| [1] | 0   | 1   | 1   | 1   | 1   | 1   |
| [2] | 1   | 0   | 1   | 1   | 1   | 2   |
| [3] | 1   | 1   | 0   | 1   | 2   | 2   |
| [4] | 1   | 1   | 1   | 0   |     |     |
| [5] | 1   | 1   | 2   |     | 0   |     |
| [6] | 1   | 2   | 2   |     |     | 0   |

Then we use the third value, 5, to achieve centrality mapable matrix:

|     | [1] | [2] | [3] | [4] | [5] | [6] |
| --- | --- | --- | --- | --- | --- | --- |
| [1] | 0   | 1   | 1   | 1   | 1   | 1   |
| [2] | 1   | 0   | 1   | 1   | 1   | 2   |
| [3] | 1   | 1   | 0   | 1   | 2   | 2   |
| [4] | 1   | 1   | 1   | 0   | 1   | 5   |
| [5] | 1   | 1   | 2   | 1   | 0   | 5   |
| [6] | 1   | 2   | 2   | 5   | 5   | 0   |

This create a centrality mapable space: The centrality values for [1], [2], [3], [4], [5], [6] are 5, 6, 7, 9, 10, 15 respectively.

Modified NEXT Algorithm

By restricting the randomized space to comply with the centrality mapability requirement, one will assure that the NEXT equivocation resolution will always work. After a set number iterations as described above, the algorithm will decide among the remaining contenders for the NEXT element based on their centrality ranking. Being centrality mapable means that there are no two elements with the same centrality value, so that this ranking will always resolve the challenge of identifying a NEXT element.

Approximation

By divorcing the notion of proximity Unbound Geometry has lost the primary tools for handling spaces comprised of very many points. The basic premise of calculus will not hold, curvature, dimensionality—have all vanished. Instead, we have a matrix which has to specify unbound distance value for every pair of points in the space. This situation calls for approximation of spaces defined in the usual ways.

We consider a multi dimensional spatial zone, Z: a well bound continuous area. We then determine how many points (n) we wish to have in the Unbound Geometry approximation of Z. Next we search in Z for coordinates for m<n points. These points are referred to as 'external points': $e_1$, $e_2$, ... $e_m$. They will also be referred to as 'the boundary set'. Based on the coordinates of these m points on the multi dimensional space where they are present, one can compute the 0.5 m(m−1) metric mutual distances between these points, and construct a distance matrix (a Unbound Geometry space) for them. Each point then would have a centrality measure computed as the sum of all its distances from the other m−1 points. The sum of all these centralities is referred to as the 'size approximation of Z with m Unbound Geometry points'.

$|Z|_m = \Sigma C(i)$ ... for $i=1,2,\ldots m$

One will now use any approximation technique to search for the coordinates of the m points such that $|Z|_m$ will be at maximum.

Once this maximum has been established, one would look for the (m+1) point, to be referred to as the 'center of Z' ($Z_c$), or the 'origin' of Z. $o_z$. $o_z$ will be a point in Z such that its centrality metric is the lowest (it is most central).

Property of $o_z$: $\Sigma[o_z, e_i]$ ... for $i=1,2,\ldots m)_{min}$

Next one selects m distances among the 0.5 m(m−1) distances of the m external points $e_1$, $e_2$, ... $e_m$. The selection is for the m shortest distances taken such that every point is connected to exactly two of the selected distances. They will be referred to as the 'boundary distances'. These boundary distances together with their central point $o_z$ will be referred to as a "Z Approximation Set".

The next step is to regard the structure so far as m 'triangles'. Each triangle is comprised of the origin $o_z$ and one of the selected boundary distances (the other two points of the triangle are the points between which the boundary distance is marked). These three points for each of the m triangles will be considered boundary set, and treated as the original boundary set. Namely each triangle will define a center point, a 'triangle center', $o_t$ as the point with the greatest centrality:

Property of $o_t$: $(\Sigma[o_t, e_i]$ ... for $i=1,2,3$ the points of the triangle)$_{min}$ This will add m points to the distance matrix now comprised of 2m+1 points. This will also define each of these m triangles as a 'triangle approximation set', which can be treated as the Z approximation set. Namely each of the m triangles will define 3 triangle inside. Each of these three sub-triangles will define a sub-triangle center, $o_{st}$. The three points of the sub-triangle plus their center $o_{st}$ will form 'sub-triangle approximation set' over which the process described above can be repeated.

We have thereby defined an iterative process where, we start with m points, add a center point ($o_z$) to count m+1 points. The add m $o_t$ for a total of 2m+1 points. The adding 3 centers per each sub triangle, 3m points for a total of 5m+1 points. And so on. This process will be repeated until the count of points reaches or comes close to the number of points (n) planned for the approximation.

The resultant space (n elements distance matrix) will be regarded as the n-size Unbound Geometry approximation of Z.

Dimensionality Responsive Approximation

The standard approximation described above may be modified to exhibit regard to the dimensionality of the Z zone. Let Z be expressed in a v-dimension (vD) space. In that case the boundary distances will be selected as the shortest vm distances among the $e_1$, $e_2$, ... $e_m$ points such that each of the m external points will be connected to v distances exactly. Instead of triangles this will lead to set comprised of v+1 'external points', for which a central point will be defined as the point most central relative to the set (with lowest centrality metric). The iterative process will continue in a similar way.

Pre-Sorting

The n elements in a reference set may be pre-sorted in some way, and this order will be used to resolve any equivocation with any geometric function. The pre-sorting could emanate from another space over the same reference set. In that other space a LINE can be chosen, and the permutation it defines will be the order assignment in the main space.

Algebraic Formalism

The unbound geometry being a generalization of the various distance-restrictions geometries, may be associated with a respective algebra. Ahead we define unbound-geometry addition and unbound-geometry multiplication. We further extend to a poly-operation where any number of input elements yield any number of output elements. Based on these algebraic staples we proceed to rigorous algebraic formalism. The collective name for the functions ahead is 'geometric functions'.

Multi Distance Abstraction

A natural abstraction of this SpaceFlip framework is to define two or more distances between any two elements of the reference set. This will not be necessary though, because it can readily be simulated by congruent one-distance spaces.

Addition

Addition: Let A and B be two elements of the reference set. We write: A+B=C, with C also a member of the set, and characterize C as the element for which the sum of its distances from A and B is minimum: $([A,C]+[B,C])_{min}$ and C≠A, B. In case that there are several elements sharing the same minimum: $([A,C]+[B,C]_{min}=([A,C]+[B,C]_{min}=([A,C"]+[B,C"]_{min}$ ... then the selected candidate will be the one for which $[A,X]*[B,X]_{max}$ where X=C, C', C", ....

In case of a consecutive space this definition will remove any possible equivocation. This definition of 'addition' identifies a resultant element for every reference set N, where |N|≥3. We first present and prove Lemma (v): in a consecutive space there are no distinct elements, [i]≠[j] in the reference set such that with respect to any two given elements, [k] and [l], the multiplication of the respective distances, and their addition is the same. Namely, there are no two integers x, and y such that x=[i,k]+[i,l]=[j,k]+[j,l], and y=[i,k]*[i,l]=[j,k]*[j,l].

Proof: we assign [i,k]=a, and [i,l]=b, [j,k]=a', and [j,l]=b'. We assume lemma (v) is wrong, so we have: a+b=a'+b', and ab=a'b'. Substitution: a+a'b'/a=a'+b', rearranging: a−a'=b'(1−a'/a)=b'(a−a')/a, leading to 1=b'/a, or b'=a which cannot be in a consecutive space, so lemma (v) is proven true.

In the general case this definition may still lead to equivocation in as much as there may be more than one element sharing that minimum value for addition and the maximum value for multiplication of distances. In that case the selection of result of the addition will be based on the distance of each result-candidate from its NEXT element. The element whose NEXT element is of the shortest distance will be the one selected. If equivocation still persists then the same "minimum distance" will be applied iteratively until all equivocation is removed. Or until it is replaced with centrality ranking.

Like it is with NEXT, the definition of 'addition' is brought here with some measure of 'specification freedom'. One could apply the centrality ranking right away, by-passing the distance of the candidates from their NEXT elements. Or perhaps allow for one or two NEXT-distance rounds before applying the centrality ranking. The salient feature of these family of definitions is that the geometric function (NEXT, addition, etc.) are always resolvable. For any two elements in a space there is an element that is the result of the addition of these two element—for addition. And for every element in the space there is a well-defined NEXT element.

Illustration, n=6

|  | [1] | [2] | [3] | [4] | [5] | [6] |
| --- | --- | --- | --- | --- | --- | --- |
| [1] | 0 | 8 | 3 | 4 | 6 | 3 |
| [2] | 8 | 0 | 3 | 3 | 3 | 5 |
| [3] | 3 | 6 | 0 | 4 | 2 | 6 |
| [4] | 4 | 2 | 4 | 0 | 7 | 7 |
| [5] | 6 | 3 | 5 | 7 | 0 | 3 |
| [6] | 3 | 5 | 6 | 7 | 3 | 0 |

By adding columns [4] and [5] we list all the values of [4,X]+[5,X] for X=1, 2, 3, 4, 5, 6:

| x | [4,X] + [5,X] |
| --- | --- |
| 1 | 10 |
| 2 | 6 |
| 3 | 6 |
| 6 | 10 |

This leaves the candidacy range to [2] and [3] which is resolved in favor of [2] because: [4,3]*[5,3]=8<[4,2]*[5,2]=9. We write:

[4]+[5]=[2]

Adding an Element to Itself

Lemma (vi): Adding an element to itself, maps it to its NEXT: [A]+[A]=NEXT([A]). Proof. Let [B]=NEXT([A]). Accordingly [A,B] is the smallest distance: $[A,B] \le [A,X|X \ne B]$, which means that $[A,B]+[A,B] \le [A,X|X \ne B]+[A,X|X \ne B]$. Let [X]=[C] be another element such that [X,A]=[X,B]. That means that C and B 'competed' for the title of NEXT([A]), and [B] won. This will then be the criteria to designate [B] and not [C] as the outcome of [A]+[A]=[B]=NEXT([A]).

We can now define tA=A+A+A . . . {t times), which yields element B=tA, the result of applying the NEXT function over A t times, starting from the right side.

This leads to equations like:

$$p[X]+q[Y]=[A]$$

where p,q are integers, and [A], [X], and [Y] members of the reference set. A solution to this equation amounts to identifying two elements of the reference set, [X], and [Y], which solve the relationship.

Multiplication

Multiplication: Let A and B be two elements of the reference set. We write: A*B=C, (or AB=C) with C also a member of the set, and characterize C as the element for which the multiplication of its distances from A and B is maximum: $([A,C]*[B,C])_{max}$ and $C \ne A, B$. In case that there are several elements sharing the same maximum: $([A,C]*[B,C])_{max}=([A,C']*[B,C'])_{max}=([A,C'']*[B,C''])_{max}$ . . . then the selected candidate will be the one for which $[A,X]+[B,X]_{min}$ where X=C, C', C'', . . . .

In the general case this definition may still lead to equivocation in as much as there may be more than one element sharing that maximum value for multiplication and the minimum value for addition of distances. This happens if all the respective distances are the same. However, there is no equivocation over a consecutive distance matrix (CDM). Any lingering equivocation can be sorted out by using a centrality mappable space, either directly or for pre-sorting purposes.

Let's illustrate with an example: a reference set [0],[1],[2],[3],[4],[5], n=6:

|  | [0] | [1] | [2] | [3] | [4] | [5] |
| --- | --- | --- | --- | --- | --- | --- |
| [0] | 0 | 8 | 3 | 4 | 6 | 3 |
| [1] | 8 | 0 | 3 | 3 | 3 | 5 |
| [2] | 3 | 6 | 0 | 4 | 2 | 6 |
| [3] | 4 | 2 | 4 | 0 | 7 | 7 |
| [4] | 6 | 3 | 5 | 7 | 0 | 3 |
| [5] | 3 | 5 | 6 | 7 | 3 | 0 |

We may compute [3]*[4] by multiplying columns [3] and [4]. We list all the values of [3,X]*[4,X] for X=0, 1, 2, 3, 4, 5:

| X | [3,X] * [4,X] |
| --- | --- |
| 0 | 24 |
| 1 | 9 |
| 2 | 8 |
| 3 | 0 |
| 4 | 0 |
| 5 | 21 |

This leads to [3]*[4]=[0]

Multiplying an element to itself, maps it to its remote-NEXT: A*A=B where $[A,B]_{max}$.

We can now define $A^t$ as A*A*A . . . {t times).

We can also write equations like:

$$X^p+Y^q=A$$

where p,q are integers, and A, X, and Y members of the reference set. Then we may examine if there is a solution (X,Y) to this equation.

Referring to the same reference set as in the above example we seek to determine $[4]^4=[4]*[4]*[4]*[4]$. [4]*[4]=[3] because [3,4] is the longest distance from any element to [4]. So [4]*[4]*[4]*[4]=[4]*[4]*[3]. We have seen above that [4]*[3]=[0]. So we write:

$$[4]^4=[4]*[4]*[4]*[4]=[4]*[4]*[3]=[4]*[0]=[3]$$

Progressive Operations

Any repeat operation like addition to =A+A+A . . . or multiplication $A^t$=A*A*A . . . may be conducted such that the result of each unit operation will be an element that was not selected beforehand. In other words, any element can be selected once. And once selected it is excluded from the candidacy ranks. We regard such a repeat operation as "progressive". Written as $tA|_p$, $A^t|_p$.

A progressive operation repeated t=n times (n the number of elements in the reference set) will amount to listing a permutation of all the elements in the set. The first element in the permutation is the element operated on t times, and the last element in the permutation is the result of the t repeat operations.

Illustration:

|     | [0] | [1] | [2] | [3] | [4] | [5] |
| --- | --- | --- | --- | --- | --- | --- |
| [0] | 0   | 8   | 3   | 4   | 6   | 3   |
| [1] | 8   | 0   | 3   | 3   | 3   | 5   |
| [2] | 3   | 3   | 0   | 4   | 2   | 6   |
| [3] | 4   | 3   | 4   | 0   | 7   | 7   |
| [4] | 6   | 3   | 2   | 7   | 0   | 3   |
| [5] | 3   | 5   | 6   | 7   | 3   | 0   |

Here n=6, So we compute $[3]^6|_p$: [3]*[3]*[3]*[3]*[3]*[3]. [3]*[3] looks at two candidates [4] and [5], both have the highest distance value from [3]. But pre-sorted [4] prevails: [3]*[3]=[4]. Now [3]*[4]=[0] since the multiplication of [0,3]*[0,4]=24 is the highest. We have now: $[3]^6$=[3]*[3]*[3]*[3]*[3]*[3]=[3]*[3]*[3]*[3]*[3]*[4]=[3]*[3]*[3]*[0].

We compute [3]*[0]=[5], since [5,3]*[5,0]=42 is the largest value. Writing $[3]^6|_p$=[3]*[3]*[5]. We write: [3]*[5]=[2]. Computing now $[3]^6|_p$=[3]*[2]. The largest distance multiplication is relative to [5] since [3,5]*[2,5]=42. But [5] already was used in the computation, so it cannot be used again. We turn now to the second value: [3,4]*[2,4]=35. Alas [4] too was already in the sequence. The third in line is [0]—which also was listed before. This leaves [1] as the remaining candidates [3,1]*[2,1]=9.

We can write then:

$[3]^6|_p$=[1]

The progressive exercise also defined a particular permutation of the reference set: [3], [4], [0], [5], [2], [1]

We can also compute $6[3]|_p$=([3]+[3]+[3]+[3]+[3]+[3])$_p$. [3]+[3]=[1] since [3,1]=3 is the minimum. [3]+[1]: There are two elements which claim the same minimum [3,X]+[1,X]=10, X=[2], [4]. We assume the elements are pre-sorted (e.g.: through a sorting distance matrix with a centrality mapable feature). Since the elements are pre-sorted, the equivocation is resolved in favor of [2], and we write [3]+[1]=[2].

[3]+[2]: The shortest distance from both element is exhibited by element [1] ([3,1]+[2,1]=6), but [1] was already used in the sequence, so the second candidate is used: [3,0]+[2,0]=7, and we write [3]+[2]=[0]. We continue: [3]+[0]. The shortest sum of distances to [3] and [0] is exhibited by [2], which is already "burnt". Next in line is [5]. We therefore write: [3]+[0]=[5]. [3]+[5]: [0] has the shortest distance summary from [3] and [5] (7), but it was already used. [1] is second in line—used too. [2] and [4] are together next in line, but [2] was already used, so we write: [3]+[5]=[4], and in summary:

$6[3]|_p$=[4]

This exercise defined a particular permutation of the reference set: [3],[1],[2],[0],[5],[4]

Equations

Dynamic systems are normally described with equations of one or more variables. At times these equations defy easy solutions, or any solution, owing to their mathematical complexity. Such equations use some underlying geometry to describe the dynamics of interest. The work herein suggests that by casting the dynamics on a different space (geometry) the respective equations would assume a different forum. One would then explore the most advantageous spatial representation to yield most solution-convenient equations. It was Albert Einstein who suggested a modified description of space-time to allow for equations that account for gravity without the Newtonian invocation of a mysterious gravity force.

The above comment is highly theoretical. In practice, the equations discussed here seem very challenging as far as solutions are concerned because the various operation, NEXT, LINE, FIGURE, addition, multiplication, etc., are all one-way functions in the sense that they go unequivocally one way, but experience various degrees of equivocation in the opposite direction.

The basic NEXT function determines a clear output, but given a next-element, finding the pre-next element may be limited by the fact that there may be more than one pre-NEXT element, and it is necessary to supply more information in order to identify the particular pre-NEXT element. We deal with this option through the BEFORE function. And when the NEXT is repeated towards building a permutation then every NEXT step this equivocation multiplies. It is similar for addition and for multiplication. An equation with two variables like the following may defy an easy solution:

$$\Sigma a_r X^r + \Sigma b_u Y^u = q X^P Y^B$$

And require a brute force approach to find whether there is one or more solutions for it.

To generalize the above equation to accept any integer, we may want to interpret any integer, say, p, in a modular fashion p→p MOD n.

PolyOps: Poly Operations

So far we have identified a unary operation (NEXT) and binary operations (addition, multiplication). We now broaden the field of operations to the general case where u-elements are operated on to yield v elements, where u,v≥1.

We write:

$$\{y_1, y_2, \ldots y_v\} = \text{Poly-}[*](x_1, x_2, \ldots x_u)$$

Where $x_1, x_2, \ldots x_u$ are u arbitrary elements in a Space, Poly-[*] is the "poly" version of basic operation: either addition, "Poly-Add" (PolyA) or multiplication "Poly-Mult" (PolyM); and $y_1, y_2, \ldots y_v$ are the v elements in the Space which are the result of the "poly mapping". We also use the term PolyNEXT instead of Poly*. We further mandate that the set of u x-elements and the set of v y-elements have no element in common. This dictate that u+v≤n=|N|.

Defining "Poly-Add": Given arbitrary u elements in a reference set of a Space $x_1, x_2, \ldots x_u$, we associate with them v elements of the same space: $y_1, Y_2, \ldots y_v$, such that:

$$d_a = \Sigma(\Sigma([x_i, y_j]) \ldots i=1,2, \ldots u)_{min} j=1,2, \ldots v$$

In the event that there are more than one set of v elements that share the same minimum value, $d_a$, then these competing groups will be compared according to the multiplication value of the all the summed distances:

$$d_m = \Pi\Pi[x_i, y_j] \ldots \text{ for } i=1,2, \ldots u \text{ and } j=1,2, \ldots v$$

The group of v elements with the highest $d_m$ value will be the result of the PolyA operation. In the case where two or more groups of v elements will share the $d_{mmax}$ value, these groups will be compared based on the sum distances of each group members from their respective NEXT elements. We compute:

$$d' = \Sigma[y_j, \text{NEXT}(y_j)] \text{ for } j=1,2, \ldots v$$

The group of v elements with the smallest value of d' will be the result of the Poly-Add operation. If equivocation still lingers, the same comparison will be iteratively reapplied:

$$d'' = \Sigma[\text{NEXT}(y_j), \text{NEXT}(\text{NEXT}(y_j))] \text{ for } j=1,2, \ldots v$$

This iteration can be stopped after an arbitrary number of rounds. If we limit ourselves to Centrality Mapable spaces then the resolution between the competing sets will be achieved by ranking all the competing sets according to the centrality values of their members. The set where the lowest centrality member is the lowest will be the designated result of the Poly operation. If there are two sets sharing the same element then the selection will be carried out according to the second lowest centrality value, and so on. Since the competing sets are not identical, this selection process will definitely resolve the selection question.

Note that all the Poly operations are dependent on all the distance values in the Space.

We now define PolyM in a similar fashion: We compute $d_m$:

$$d_m = (\Pi\Pi[x_i, y_j]) \ldots \text{ for } i=1,2,\ldots u \text{ and } i=1,2,\ldots v$$

And select the group of v elements for which $(d_m)_{max}$. If there are two or more groups sharing the same maximum then, we compute for each of these competitors the $d_a$ value:

$$d_a = \Sigma(\Sigma([x_i, y_j]) \ldots i=1,2,\ldots u)_{min} \ldots j=1,2,\ldots v$$

And select the group which $d_a$ is minimum $(d_a)_{min}$. If equivocation remains one would use the NEXT distance criteria the same way it was defined for PolyA.

It is easy to see that PolyA is an extension of binary addition, and it coincides with it for u=2, v=1. And similarly PolyM is an extension of binary multiplication and it coincides with it for u=2, v=1.

These PolyOps define operation which may increase the number of elements involved, decrease that number of leave it the same.

They naturally lead to the respective power operation. For the case where u=v we define:

$$\{z\}_u \text{PolyA}(u:u)^t(\{x\}_u) = \text{PolyA}(\ldots \text{PolyA}(\text{PolyA}(\{x\}_u)) \ldots)$$

And similarly for PolyM:

$$\{z\}_u \text{PolyM}(u:u)^t(\{x\}_u) = \text{PolyM}(\ldots \text{PolyM}(\text{PolyM}(\{x\}_u)) \ldots)$$

Note that there appears to be no shortcut calculation of the Poly functions because an element that has a short distance to one of the x-elements, may have an exceptionally long distance towards another of the x-elements. And similarly for multiplication. For large n and large v the number of option to be examined $C^v_n$ is very large.

Thick Lines

A PolyOp where v=u, maps u elements to v=u elements. It can be viewed as an extension of the NEXT function, over a set of elements larger than one. Simple NEXT can be regarded as a PolyA with u=v=1.

Since LINE is defined over NEXT, a so called "THICK-LINE" can be defined over a PolyOp. A starting set of u elements $Z_0 = \{[x_{01}], [x_{02}], \ldots [x_{0u}]\}$ will be mapped to a 'next' set $Z_1 = \{[x_{11}], [x_{12}], \ldots [x_{1u}]\}$ $$Z_1 = \text{THICKLINE}(Z_0, 1)$$

And in general:

$$Z_i = \text{THICKLINE}(Z_0, i)$$

Where the THICKLINE function is set up to include any set $Z_i$ only once. The selection of the next set for the PolyA is conducted over the elements in the reference set that have not previously been listed in the THICKLINE.

There are $\zeta = C^u_n$ possible selections of Z sets in the reference set comprised of n element: $Z_0, Z_1, \ldots Z_{\zeta-1}$.

So a THICKLINE is longer than a regular LINE. And the closer u is to n/2 the longer the THICKLINE.

Note that while two consecutive sets $Z_i$, and $Z_{i-1}$ cannot have any two elements in common, once removed sets ($Z_i$ and $Z_{i+t}$, t=2, 3, . . . ) can have one or many (but not all) common elements.

We can also define the BEFORE function over the THICKLINE, corresponding to the definition of BEFORE over regular lines. To do so we must extend the ranking procedure over single elements to sets of elements. The way to do this is as follows.

Let there be a ranking measure r over the reference set, such that any elements [i] among the n choices is associated with a ranking number, and for any i≠j we have $r_i \neq r_j$, i,j=1, 2 . . . n. We will now use these metrics to run any arbitrary sets of u elements $Z_i$, and $Z_j$ for i,j=1, 2 . . . $\zeta$.

Let $R_{imin1}$ and $R_{jmin1}$ be the lowest value of element ranking in sets $Z_i$ and $Z_j$ respectively, where $Z_i \neq Z_j$, namely, at least one of their elements is different. If $R_{imin1} < R_{jmin1}$ then $Z_i$ is lower in rank than $Z_j$, and the opposite true in the opposite relationship of the element ranking.

If $R_{imin1} = R_{jmin1}$, then the same comparison applies to the second lowest ranking element in each set: $R_{imin2}$, $R_{jmin2}$. And if these two rankings are also equal then the test if carried out over the next ranking elements: $R_{imin3}$, $R_{jmin3}$. And so on until at some point the equality is no more. For the equality of the comparable ranking values to be held through the u elements, it is necessary for the two sets to be equals, which contradicts the assumption that $Z_i \neq Z_j$ As to the ranking of elements, any method will do: if one uses consecutive spaces or centrality mappable spaces then all the elements are unequivocally ranked.

Much as for the BEFORE over a regular LINE: to identify a 'before' set $Z_{i-1}$ relative to a pre-before set: $Z_i$, one has to identify all the w sets that would regard the pre-BEFORE set $Z_i$, as their PolyNEXT set,—rank them as described above $h_1, h_2, \ldots h_w$, identify in this ranking the rank of the proper 'before' set, $Z_{i-1}$, $h_i$, and convey this ranking to the BEFORE function over the THICKLINE.

$$Z_{i-1} = \text{BEFORE}(Z_i, h_i)$$

And applied iteratively:

$$Z_{i-t} = \text{BEFORE}(Z_i, h_i, h_{i-1}, h_{i-2}, \ldots h_{i-t+1})$$

Similar to the LINE case, this unequivocal definition of BEFORE is limited to the section of line from the beginning to the first inflection point, and not beyond because the choice of elements beyond the inflection points depends on the identities of the element sets in the line so far.

In a similar way one would define a Broadening-LINE (BLINE) (v>u) and a Narrowing-LINE (NLINE) (v<u) over any Poly* function. The mathematics is the same as for a THICKLINE.

Incremental/Decremental PolyOps

We identify a special class of PolyOps—the incremental/decremental class, where v=u+1 or v=u−1. We write:

$$\{y\}_{u+1} = \text{PolyAPlusOne}(\{x\}_u$$

$$\{y\}_{u-1} = \text{PolyAMinusOne}(\{x\}_u, \ldots \text{ for } u>1$$

To indicate PolyAdd function. And similarly:

$$\{y\}_{u-1} = \text{PolyMPlusOne}(\{x\}_u$$

$$\{y\}_{u-1} = \text{PolyMMinusOne}(\{x\}_u, \ldots \text{ for } u>1$$

To indicate PolyMult functions

We can resort to power notation:

$$\{y\}_{u+t} = \text{PolyAPlusOne}^t(\{x\}_u$$

$$\{y\}_{u-t} = \text{PolyAMinusOne}^t(\{x\}_u \text{ for } t<u$$

$\{y\}_{u+t}$=PolyMultMinusOne$^t(\{x\}_u$ $\{y\}_{u-t}$=PolyMultMinusOne$^t(\{x\}_u$ for $t<u$ Sets, Blocks and Order The basic notion of sets can be expressed in a space by adding an additional element (element (n+1))—the 'set defining element', then setting the distances of some elements of the space to be of a fixed value, a to the 'set defining element' and setting up the distances of all the rest of the elements in the space to be of a different value towards the set defining element.

Let a reference set A be comprised of n elements. p of these elements form a set P, a subset of A (P⊂A): [$x_1$] [$x_2$], ... [$x_p$] The remaining n-p elements [$y_1$], [$y_2$], ... [$y_{n-p}$] are not members of P. Let [$x_0$] be designated as the set P defining element. We set [$x_i$, $x_0$]=α (α=1,2, ... ), for i=1, 2, ... p and set all other distances to be different: [$y_i$, $x_0$]≠α, for i=1, 2, ... (n-p). A given element can belong to many sets. Each set will be defined by its own set defining element.

Let a reference set A be comprised of n elements. p of those elements, will be regarded as forming a 'block set' or a 'block,', P ∈ A: a collection of elements, P={[$x_1$] [$x_2$], ... [$x_p$]} such that [$x_i$, $x_j$]=α (α=1, 2, ... ). The other elements in A are [$y_1$], [$y_2$], ... [$y_{n-p}$]. We require that [$x_i$, $y_k$]=[$x_j$, $y_k$] for k=1, 2, ... (n-p), and i,j=1, 2, ... p. In other words, all elements of a block have the same distances from non-block elements, and all their mutual distances are the same. Elements of a block cannot be distinguished one from the other.

Multi Dimensional Reference Set

Let us define the reference set N as |N|=n as the set of all possible p-size tuples: {$x_1$, $x_2$, ... $x_p$} where each $x_i$ may assume v labels. We have |N|=n=$v^p$. So far we limited ourselves to p=1, each element was identified by a single id (label). We regard the i-th label of a given element of N as the i-th aspect of that element. Two elements, u {$x_1$, $x_2$, ... $x_p$} and u' {$x'_1$, $x'_2$, ... $x'_p$} are one and same only if all their labels in every dimension are the same: $x_i$=$x'_i$ for i=1, 2, ... p. As before, the distance between two identical elements is zero d($u_i$,$u_i$)=0 for i=1, 2, 3, ... n and also, as before d($u_i$,$u_j$)>0 for i≠j, i,j=1, 2, ... n.

One can interpret the i-th aspects of the n elements, as a "one-dimensional reference set", and associate with that set a distance matrix (space): a set of 0.5 v(v−1) distances: d($x_{ik}$, $x_{jk}$) where $x_{lk}$ is the k-th aspect of element 1, 1=i,j.

Such construction will define p distance spaces. From them one can define a full space about the n elements of N by setting:

$$d(u,u')=\Sigma d(x_{ui},x_{u'i}) \ldots \text{ for } i=1,2,\ldots p$$

The NEXT, LINE, FIGURE and addition and multiplication operations will be defined as usual.

u' will be u'=NEXT[u] if, and only if: $d(u,u')_{min}$=(Σd($x_{ui}$, $x_{u'i}$))$_{min}$ which is easy to compute since:

$$(\Sigma d(x_{ui},x_{u'i}))_{min}=(\Sigma d(x_{ui},x_{u'i \, min}))$$

The multi dimensional reference set will entail computational load proportional to pv, but will impose a complexity proportional to $v^p$. This disparity is the motivation for use of the multi dimensional reference set.

Illustration of Multi Dimensional Reference Sets

Let's consider a reference set N comprised of n=$8^3$=512 elements, each identified by p=3 dimensions w(x,y,z) and each dimension has v=8

The first dimension (x) is associated with the x-space:

|     | [1] | [2] | [3] | [4] | [5] | [6] | [7] | [8] |
|-----|-----|-----|-----|-----|-----|-----|-----|-----|
| [1] | 0   | 3   | 5   | 7   | 9   | 11  | 13  | 15  |
| [2] | 3   | 0   | 2   | 4   | 6   | 8   | 10  | 12  |
| [3] | 5   | 2   | 0   | 17  | 19  | 21  | 23  | 25  |
| [4] | 7   | 4   | 17  | 0   | 14  | 16  | 18  | 20  |
| [5] | 9   | 6   | 19  | 14  | 0   | 27  | 1   | 22  |
| [6] | 11  | 8   | 21  | 16  | 27  | 0   | 24  | 26  |
| [7] | 13  | 10  | 23  | 18  | 1   | 24  | 0   | 28  |
| [8] | 15  | 12  | 25  | 20  | 22  | 26  | 28  | 0   |

The second dimension, is associated with a different, y-space:

|     | [1] | [2] | [3] | [4] | [5] | [6] | [7] | [8] |
|-----|-----|-----|-----|-----|-----|-----|-----|-----|
| [1] | 0   | 26  | 5   | 21  | 9   | 11  | 13  | 14  |
| [2] | 26  | 0   | 25  | 20  | 6   | 16  | 10  | 12  |
| [3] | 5   | 25  | 0   | 15  | 19  | 7   | 23  | 2   |
| [4] | 21  | 20  | 15  | 0   | 17  | 8   | 18  | 4   |
| [5] | 9   | 6   | 19  | 17  | 0   | 27  | 1   | 22  |
| [6] | 11  | 16  | 7   | 8   | 27  | 0   | 24  | 3   |
| [7] | 13  | 10  | 23  | 18  | 1   | 24  | 0   | 28  |
| [8] | 14  | 12  | 2   | 4   | 22  | 3   | 28  | 0   |

The third dimension, is associated with a different, z-space:

|     | [1] | [2] | [3] | [4] | [5] | [6] | [7] | [8] |
|-----|-----|-----|-----|-----|-----|-----|-----|-----|
| [1] | 0   | 24  | 18  | 21  | 28  | 6   | 13  | 1   |
| [2] | 24  | 0   | 25  | 4   | 20  | 16  | 10  | 12  |
| [3] | 18  | 25  | 0   | 15  | 19  | 7   | 23  | 2   |
| [4] | 21  | 4   | 15  | 0   | 17  | 8   | 5   | 11  |
| [5] | 28  | 20  | 19  | 17  | 0   | 10  | 3   | 22  |
| [6] | 6   | 16  | 7   | 8   | 10  | 0   | 14  | 26  |
| [7] | 13  | 10  | 23  | 5   | 3   | 14  | 0   | 9   |
| [8] | 1   | 12  | 2   | 11  | 22  | 26  | 9   | 0   |

We identify the labels of the dimensions as $[i]_x$, $[i]_y$, $[i]_z$, for i=1, 2, ... v. Let's compute the distance d(u,u') where multi-dimensional element u=u(x,y,z)={$[3]_x$, $[5]_y$, $[4]_z$}= {[3],[5],[4]}, and u'=u'(x',y',z')={$[8]_x$, $[1]_y$,$[6]_z$)}'={[8],[1], [6]}.

We first compute d(x,x')=[3][8]=25 as seen in space x. We them compute d(y,y')=[5][1]=9, and finally: d(z,z')=[4][6]= 8, and hence:

$$d(u,u')=(x,x')+d(y,y')+d(z,z')+[3][8]+[5][1]+[4][6]=25+9+8=42$$

We now wish to identify the element u"=NEXT(u). We know that for u" we have $d(u,u")_{min}$, and since all the spaces are filled with consecutive distances there is no possibility for equivocation. We also write:

$$d(u,u")_{min}=d(x,x")_{min}+d(y,y")_{min}+d(z,z")_{min}$$

which implies: x"=NEXT(x), y"=NEXT(y), z"=NEXT (z), and hence x"=NEXT([3])=[2] as seen on space-x: [3][2] is the smallest distance among [3][1], [3][2], [3,4], ... [3,8]. And similarly y"=NEXT(y)=NEXT([5])=[7] since [5][7]=1 as shown on space-y. And now z"=NEXT(z)=NEXT([4])= [2] since [4][2]=4 is the shortest distance.

This identifies u" as {[2],[7],[2]}: {[2],[7],[2]}=NEXT ({[3][5][4]}). And:

$$d(u,u")_{min}=[3][2]_x+[5][7]_y+[4][2]_z=2++4=7$$

Distances as Reference Sets

A reference set N of size |N|=n defines a space through q=0.5n(n−1) mutual distances. These q distances may define a new (larger) reference set $N^q$ (a q-set) where $|N^q|$=q. This can be repeated any number of times, defining ever larger reference sets.

This setup can be used "backwards": By selecting an element [i] in the $N^q$ space, one defines a LINE there LINE([i]), which amounts to a permutation of the q elements in $N^q$. The ordinal value of each of the q elements may be regarded as the distance value in the originating space N.

Illustration

Let the reference set N (|N|=n=4) be [1], [2], [3], [4]. be written with the distances written as variables:

|     | [1]   | [2]   | [3]   | [4]   |
|-----|-------|-------|-------|-------|
| [1] | 0     | [1,2] | [1,3] | [1,4] |
| [2] | [1,2] | 0     | [2,3] | [2,4] |
| [3] | [1,3] | [3,2] | 0     | [3,4] |
| [4] | [1,4] | [2,4] | [3,4] | 0     |

And let us now construct the respective q-set $N^q$:

|       | [1,2] | [1,3] | [1,4] | [2,3] | [2,4] | [3,4] |
|-------|-------|-------|-------|-------|-------|-------|
| [1,2] | 0     | 1     | 2     | 3     | 4     | 5     |
| [1,3] | 1     | 0     | 6     | 7     | 8     | 9     |
| [1,4] | 2     | 6     | 0     | 10    | 11    | 12    |
| [2,3] | 3     | 7     | 10    | 0     | 13    | 14    |
| [2,4] | 4     | 8     | 11    | 13    | 0     | 15    |
| [3,4] | 5     | 9     | 12    | 14    | 15    | 0     |

We arbitrarily decide to choose element [1,4] as the first element of the full line on $N^q$, and then use the distances of $N^q$ to determine the permutation of the line:

[1,4][1,2][1,3][2,3][2,4][3,4]

And accordingly populate the distances in N using the ordinal number of each distance in N as its value:

|     | [1] | [2] | [3] | [4] |
|-----|-----|-----|-----|-----|
| [1] | 0   | 2   | 3   | 1   |
| [2] | 2   | 0   | 4   | 5   |
| [3] | 3   | 4   | 0   | 6   |
| [4] | 1   | 5   | 6   | 0   |

Dimensionality Equivalence

Unbound Geometry has no dimensions, while dimensionality is the prime ingredient in metric and topological spaces. It is therefore important to show the dimensionality equivalence of Unbound Geometry. Let vD be a v-dimension metric space, where v=1, 2, 3, .... The points in vD are characterized by v values, specifying the v coordinates of each point. Topologically we can massage vD to adjust the inter-dimensional scales $\alpha_1, \alpha_2, \ldots \alpha_v$ in the following way: Let $d_i$ be the largest projection of any point in vD on dimension i. We will adjust the scale $\alpha_i$ so that the lowest projection on dimension (i+1) will be larger than $d_i$. By so doing over all the v−1 dimensions v=2, 3, . . . v we will create a situation where the metric distance between any two points on the space, [a] and [b], [a,b] will be resolved only in one way. The equation:

$$[a,b]^2 = \Sigma |d_{ai} - d_{bi}|^2 \ldots \text{for } i=1,2,\ldots v$$

over any 2 points in vD will define the configuration between these points, up to dimensional shifting. $d_{ai}$ and $d_{bi}$ represent the projections of points [a] and [b] on dimension i.

We now set up a Unbound Geometry over the very same set of n points and fix the distance between any two points in the set to be the metric distance computed from vD. The resultant Unbound Geometry Space and the vD Space are thus equivalent.

With this construction we achieve a dimensionality-free representation of multi-dimensional data. Analyzing this configuration may complement topological data analysis in finding hidden pattern in big data.

Unbound Geometry Cryptography

We have described a mathematical framework based on complex geometry and simple algorithmic steps. Together they allow for a starting value to transform into an end-value based on the underlying geometry. By preserving this geometry as a secret key, we enable this framework as a cryptographic platform. The cryptographic efficacy of this platform depends on the size and complexity of the geometry. By allowing for Unbound Geometry with randomized distances we maximize the geometric complexity per its size; and we can grow it by simply adding more points to the 'space'— the manifestation of this geometry.

The algorithmic steps defined in this paradigm, to be identified by the term SpaceFlip are functions which map a set of points on the space to a different set of points on the same space. The simplest such action is the NEXT function that maps any point on the space to its next. The NEXT function, as well as the more involved ones (addition, multiplication, raising to power, and poly-ops), are based on integer comparison among a collection of distance values between points of the space: a very basic computational primitive. Yet, the mappings are highly one-way, and the results depend on the space as a whole, even for the simple NEXT function. Based on these features we can define a very versatile cryptographic tool-box.

This basic operation is very efficient both in software and in hardware, and therefore will allow for very large geometries to be used while keeping the respective operation fast and battery friendly.

We consider some alphabet $\{A\}_n$ $a_1, a_2, \ldots a_n$, and regard its n letters as the reference set over which a space S is defined, namely a set of 0.5n(n−1) distances is specified between the letters. Any power of 2 will be a good choice for n (n=$2^p$). S will be comprised of q=$2^{p-1}(2^p-1)$ distance values.

For practical reasons we may wish to express the q distances as fixed-size bit strings, of size b bits, which will limit the possible distance values between 0 and $2^b-1$.

If one chooses the consecutive mode to define S, then one would map the numbers 1, 2, 3, . . . q in some order. There are q! options.

One may use Base64 as the reference alphabet, then n=64=$2^6$. The space then will be mapped with the numbers 1, 2, . . . 2016 (0.5*64*63). This can be done with bit strings of 11 bits each ($2^{11}$>2016), so the space (the key) would be comprised of 2016*11=22,176 bits.

Space Refreshing:

Alice and Bob sharing a secret space S may, when desired, refresh its contents by agreeing on some reshuffling operation. For example they would agree to shift the distances in the upper triangle (above the zero diagonal) some t times to the right or to the left, in a circular motion. They will then shift up or down (as the case may be) the distances in the lower triangle (below the zero diagonal). Followed that shift they may agree to shift the upper triangle up or down and the lower triangle right or left. They can agree on any sequence of such shift operations. These shifts are best done in secret, but if the original space (pre shift configuration) is kept secret then the refreshing steps even if they are announced in th open, do not reveal the content of the space. Clearly though each such reshuffling would change the results of all the operations defined in this geometry. The vulnerability of such ciphers are credibly computable by the users, who can decide whether the risk is acceptable. Ahead we explore how this principle manifests itself with several cryptographic primitives, as well as some related options (FigLeaf).

Party Authentication

We consider the standard case where Alice and Bob share a secret with which they wish to authenticate themselves to each other whenever any of them wishes to start a communication session with the other. They wish to do so under the assumption of being totally exposed to an adversary that would attempt to use the sum total of their communication to subsequently fool one party that he, the adversary, is their bona fide communication partner.

The standard way to insure such resistant mutual authentication is to use the shared secret as a source for authentication dialogue which does not repeat itself. We designate the party trying to prove its identity as the prover, and the party authenticating the partner as the verifier. There are various ways in which the prover uses the shared secret (shared key, K) to generate proving data, P, which the verifier ascertains as proof that the issuer of P has knowledge of K, and so deserves to be authenticated. To prevent re-play of old P instances, the verifier will have to keep a growing log of the P instances, which is a burden.

Using SpaceFlip parties will share a secret space (alphabet and distance matrix). The verifier will challenge the prover by specifying a FIGURE through its construction parameters and its starting element. The prover will be asked to identify the end-element of the FIGURE. A proper identification of the element will prove knowledge of the space (the distance matrix, the shared key). We have seen that any space can support an indefinite list of FIGURES. This means that the parties will never run out of new proving challenges (even for small spaces).

In particular the verifier will identify the starting element, [x], then will identify a list of integers $t_1, t_2, \ldots t_i, \ldots$. The list will be indefinitely long and each of the integers may range from $1 \le t_i \le n$, where n is the number of elements in the space. By increasing the number of integers (one increases the number of lines that comprise the FIGURE, and hence points out a different FIGURE, with its unique end point element [y].). By reporting [y] as the end-element of the FIGURE, the prover will prove his or her identity.

Security analysis: since the space is defined via random distance numbers, there are only two ways to crack the authentication protocol: (i) to write equations based on the FIGURE definition and the accepted response. The equations will be over the $q=0.5n(n-1)$ variables, and will need as many authentication instances to be productive. (ii) to apply the brute force approach and check each of the distance matrix options vis-v-vis the data of the previous authentication cases. The very simplicity of the definition of the FIGURE quenches any hope for some mathematical brilliance as a means of cryptanalysis. This also means that by adjusting the size of the space the parties control and can properly appraise the strength of the projected security.

Taking for reference the consecutive space over Base64, namely n=64. $q=0.5*64*63=2016$. Solving a growing set of equations with 2016 variables is quite a prohibitive task. The brute force approach is even more daunting. Referring to the consecutive space, there are 2016!=2.325849581 E+5788 . . . options. Even for a very small space, say n=32, we have $q=0.5*32*31=496$. 496 variables are not anything feasible to solve even if the parties have used that many cases of authentication. And 496!=1.975842185 E+1123

The authenticating parties would be able to appraise how many times they would need to authenticate one to the other, and from that appraisal they would be able to design a sufficiently large space (distance matrix and alphabet).

The challenging verifier may use a randomness source to select both the starting element, and the $t_1, t_2, \ldots t_p$ integers that define the FIGURE to be evaluated by the prover. Using a sufficiently large figure and a good randomized choice there will be negligible probability for repeating the same challenge twice. The value of p may be tied to time and data. It becomes larger with time, to further reduce any chance for duplication. (Note: it is always possible to remember all the past challenges. The point here is that since the risk of duplication is so small, there is no need to remember past challenges). Since there are n choices for the starting elements (n is the size of the reference set), and each of the p parameters can also assume n values (1, 2, . . . n) there are $n^{p+1}$ possible challenges. For Base64 space, as above (n=64), if the FIGURE is defined by p=4 parameters (4 consecutive LINES) then there are more than one billion possible challenges. And, of course, if necessary, or if the threat level rises, the challenger can unilaterally increase the value of p.

The authenticating parties may be using the SpaceFlip paradigm for secure communication. They could use the same space for both tasks, but it may be advisable to separate the spaces to keep the "virginity" of the authentication space untainted by excessive use of encrypted flow.

The parties may repeat the authentication procedure as many times as any party desires, by initiating a challenge to the other party. The challenge may be executed even within a communication session, especially if something in the communication raises suspicion of a compromise.

SpaceFlip Authentication Design

The SpaceFlip authentication apparatus is comprised of the following functions:

1. The Authentication Manager
2. The Unilateral Randomizer
3. The Distance Matrix
4. The Geometric Function Evaluator
5. The Communication Module These components appear in both the prover and in the verifier. In general the parties may switch roles at will.

From the Verifier standpoint. The opposite party signals a wish to start a communication session. The signal comes through the communication module to the Authentication Manager (AM). The AM invokes the randomizer (which may be algorithmic, white noise, or quantum grade, like the "rock of randomness"). Based on the return from the randomizer the AM defines the id of an element in the space (the starting element), and the t-parameters of the FIGURE to be evaluated. This data is then communicated to the Geometric Function Evaluator which has access to the distance matrix. Reading the matrix the Geometric Function Evaluator computes the end element of the FIGURE, and communicates the result to the AM. The AM sent (through the communication module) the same definition of the FIGURE to the other party (the prover). The AM waits for the response of the prover and then compares the response to the result submitted by the local Geometric Function Evaluator. If the results agree the test has been successful, and in that case either the AM signals up the electronic hierarchy that the opposite communication partner is bona fide, or the AM decides on another test with another FIGURE. If the results don't agree the AM rejects the prover, and then runs through a pre designed 'rejection response protocol.

From the prover standpoint: it first sends a request to open a session to the verifier, then awaits for the challenge (the FIGURE parameters and the starting element). When the challenge is received through the communication module, the AM sends the data to the Geometric Function Evaluator which accesses the distance matrix to evaluate the identity of the end-element of the FIGURE, and pass it to the AM, which then sends it to the other party via the communication module. It then awaits the response of the Verifier. The options are (i) rejection, (ii) another challenge, (iii) authentication signal, in which case the target communication between the parties commences.

All these functions may be implemented in software, hardware, firmware, or a combination thereof. Hardware implementation allows for high grade security fence around the shared secret space (the distance matrix). The highest security will be achieved by separating the space (the distance matrix) and the Geometric Function Evaluator behind an 'attack resistant firewall'. The most effective 'attack resistant firewall' is a physical separation of the matrix-evaluator complex (the geometric evaluator and the distance matrix). These two modules may be built into an add-on chip, which is plugged in when needed, and removed when the authentication is complete. Referring to this complex as the authentication key, it can be featured as a personal dongle for human use (when two human users wish to authenticate themselves one to the other). It can be featured into a payment card to authenticate the payer.

The fence around the authentication key may have a communication link via Bluetooth or NFC, or through camera connection. For example the authentication key may be housed in a personal watch which is Bluetooth connected to a phone, iPad or computer. The latter sends challenge parameters to the watch and gets the results from it. Works both for the prover and the verifier.

It is also possible to secure only the distance matrix (a passive chip) and draw the fence around it leaving the geometric function evaluator outside this fence.

In some implementations it would be advisable to keep the distance matrix in hardware at one end, and in software at the other end. This is especially attractive when a full size computer manages several Internet-of-Things devices. The devices will have the matrix in hardware, and the computer will have the same is software.

SpaceFlip Authentication Control Center

We address the challenge of a control center, communicating with w communication partners (e.g. IoT devices), each with its own space (distance matrix): $S_1, S_2, \ldots S_w$. The simplest way is to keep the w spaces process ready. When this option becomes too cumbersome on account of the quantity of data so handled, the control center can then sacrifice some randomness and key the w spaces algorithmically connected to each other, so as to dynamically compute the content of each space when needed. The spaces may be related by right-left shifting or by modular arithmetic. E.g multiplying the distance value by a number larger than the size of the alphabet.

Repeat Authentication Made

The above described authentication procedure may be applied many times throughout a communication session, and in parallel thereto. For example a secure communication over a computer can be accompanied by invoking every, say, 5 minutes, a challenge by the communication partner. The challenge is communicated via the prover's computer. The prover computer has, say, a Bluetooth connection to the prover's wearable device. The device either includes just the 'space' (the distance matrix) or the space plus the geometric function evaluator. The challenge is responded to without human intervention by the person who wears the wearable. The space containing wearable may be an electronic wrist watch of an in-body implant.

Hashing

The PolyOp functions for cases where the number of output elements v is smaller than the number of input elements u are a natural hashing tool. Several of them can be applied in some succession to hash any large data string to any desired smaller size.

In particular let's focus on binary operations: defined herein (addition and multiplication). We use the symbol "*" to signify such an operation (whether addition or multiplication), and use it consecutively over a string of letters.

Let a message M be comprised of a sequence of l letters $m_l, m_{l-1}, \ldots m_1$ drawn from an n letters alphabet, $\{A\}_n$: $a_1, a_2, \ldots a_n$.

Let one construct a space, S, in which the n letters are configured. Namely assign values to all the bilateral distances between the letters of $\{A\}_n$. Based on S we can write: $H = m_l * m_{l-1} \ldots * m_1$ Where H is letter of $\{A\}_n$ ($H \in \{A\}_n$).

The hashing procedure may enjoy some varieties. Each hash can pick one of the two operations (addition or multiplication, in any of their defined varieties, and in any combination). Different hash operations may choose a different direction: right to left, or left to right. This technique can be applied by keeping the space secret between transmitter and recipient, so that the hash that accompanies the message will authenticate its integrity and the identity of the transmitter. It can be used with the space, S, in the open, and using the hash as a signature over M. The hash can be encrypted by the hasher private key, as it is normally done.

Hashing efficiency depends largely on the u/v ratio of the Poly* function selected.

$$\{y_1, y_2, \ldots y_v\} = \text{Poly}^*(x_1, x_2, \ldots x_u)$$

The larger the u/v ratio, the more efficient the hashing. The most efficient case is for v=1 One has just to check all then letters in the alphabet to find the result of the Poly*.

The hashing protocol will have to specify how to assemble the resulting v letters into a single bit string. This can be done in various ways, for example: (i) based on numerical values of the v letters, (ii) ranked by centrality, (iii) ranked by the sum total of each v letter from the original u letters. Normally hashing is rigid (weather secure or in the open). The advantage of the SpaceFlip hashing is that it lends itself to a "verification dialogue hashing" where the verifier may challenge, even several times, the prover, to hash a given document according to randomized parameters forwarded by the verifier to the prover. This test can be applied weather the prover is the author or not of the hashed data.

Verification Dialogue Hashing

Let a verifier and a prover be two online communicators. They exchange a large body of data ("document"), D. The verifier desire to prove that the prover is looking at exactly the same document. The verifier and the prover are connected via a SpaceFlip protocol, sharing a distance matrix between them. The verifier will randomly define a PolyA or a PolyM function with randomized v and randomized u values (v<u). The verifier will then request that the verifier apply the just defined geometric function to D. The verifier will also specify if the selected geometric function has to be applied once, twice, or any number, or perhaps exhaustively, namely until the shrunk (hashed) D has u letters or less. The role of the verifier and the prover can be readily exchanged. Each party may wish to verify the authenticity of the other partner and create a non-repudiation guarantee over the shared document. By picking the hash function randomly, it is necessary to be in possession of the space to respond correctly. This verification hash dialogue may be implemented in a hierarchy. A group P of p communicators may share a space $S_p$ over which any member of the group will ask at will any other member of the group to respond to a hashing challenge of any given document they handle together. It is often that a subgroup Q comprised of q members in P run a secure communication ring not privy to the other p-q members of P. This Q group could in addition to $S_p$, share their own level space, $S_q$, over which they will at will challenge each other to authenticate (hash) any document they handle between them. Of course, this subsetting may occur further, as long as there are enough members. So in parallel to the Q group another group, Q' may be set up with their own space $S'_q$. A member of P can belong both to Q and Q'. Q or Q' may be further carved into a subset W⊂Q, sharing a space $S_W$. If the hash test works for level $S_p$, but failed for level $S_q$, then it is clear that the violator is one who is aware of $S_p$, but not of $S_q$. Makes it easier to catch him or her.

Illustration: Alice sent Bob a document D comprised of exactly 100.0 megabytes. The two share a 'space' comprised of the $2^{10}$ letters, all the bit string combinations for strings of size 10 bits. This alphabet contains $2^{10}$=1024 letters. The corresponding space contains 0.5*1024*1023=536,052 distances. We may assume that the distances are a random selection from 1 to 64, and hence each distance can be expressed with 6 bits ($2^6$=64). We conclude then that the shared space amounts to 536,052*6=3,2126,312 bit=402,039 bytes, or less than half a megabyte. Bob will randomly define a PolyA function with u=50 and v=10. He will ask Alice to hash D exhaustively.

Alice will first parcel D to sections of size 10 u bits. She nets $100^6$*8/(10*50)=1,600,000 sections. Each section Alice hashes through the PolyA function Bob challenged her with. This will replace each section of original size 500 bits to a section of size 100 bits (v=10). The original D document will now be of size 1,600,000*100=160,000,000 bits=20 mega bytes. This new data pack D' will undergo the same process, again and again becoming smaller by the ratio of u/v=5 each round: 4 megabytes, 0.8, 0.16, 0.032, 0.0064 (all numbers are megabytes). 0.0064 MB=51,200 bits. Another round: 10,240 bits, then 2048 bits, which is the last round. Because 2048/5=409.6 which is less than the required 500 bits to apply the geometric function. The last round will then be carried out by ignoring the last 8 bits. There are 204 letters (10 bits strings) remaining. The last 4 of which are ignored. And the other 200 letters are taken 50 letters at a time, applying the PolyA and identifying 10 letters for each 50, resulting in (10*4=) 40 letters, for which the PolyA function cannot be applied because it requires 50 letters as input. The final report will be the last outcome: 40 letters: 400 bits hash. The particular protocol for how to handle the repeat application of the PolyA function may vary, according to various engineering considerations and preference. From a computational standpoint it is pays off to increase the value of u and decrease the value of v. In the above example, if v=1, then the ratio of shrinking the document per round is u/v=50—resulting in fewer rounds. And each round will be faster because there are fewer cases of one letter to sort out among n=1024 then to sort out 10 letters among 1024!/(10!*1014!).

Encryption

By building a shared secret distance space, S, (randomized geometry) over the n letters of an alphabet $\{A\}_n$, one could encrypt a plaintext letter p by sending over a ciphertext letter c along with a definition of geometric FIGURE, F. The transmitter will select F such that if it starts with c, it ends with p. The recipient will also carry out the evaluation of F with c as the starting element, concluding that p is the respective plaintext letter. Since there are infinite numbers of geometric FIGURES in every space, it is easy to insure that there is no repeat, no matter how often a space will be used. This limits the cryptanalysis to brute force cracking and to solving a growing set of equations with a prohibitive number of variables.

The general procedure works as follows: Alice and Bob agree on an exchange alphabet $\{A\}_n$, and on a secret distance matrix (Space) S comprised of q=0.5n(n-1) randomized integers. The only restriction on the q integers is that no two letters of the alphabet will have the same set of (n-2) distances towards the other (n-2) letters (namely we require a fully evolved space). Alice and Bob will use this shared secret to send each other any sequence of the shared alphabet, encrypting one letter at a time by substituting the plaintext letter p with its corresponding ciphertext letter c. To do so the transmitter will send the recipient the letter c and the definition of a FIGURE of choice: $F([c],t_1, t_2, \ldots t_u)$, such that: $[p]=F([c],t_1, t_2, \ldots t_u)$ The recipient will use the definition of the FIGURE, the identity of c, and compute the plaintext letter p based on the shared space, S. Alice and Bob don't need to synchronize their messages. Each will decide on how complex the FIGURE should be, according to his or her awareness of how sensitive is the information that is sent over, and how high is the threat. This generic procedure may be modified in many ways depending on the circumstances. One may note that any letter, p can be encrypted by any of the other (n-1) letters in the alphabet by reducing the FIGURE into a single LINE, and indicating the position of p, (t), in the LINE that begins with c: [p]=LINE([c],t)

This allows Alice and Bob to send each other secret messages in a form of a 'steganographic shadow' as discussed below. This basic SpaceFlip encryption can be specified in a large variety. The alphabet may be of size 2', where w=1, 2, . . . The transmitter could modify the shared space in an open algorithm that would still hide the identity of the distances. For example, if the distances are randomized between 1 and some even value r, then the distance values, d, can all be modified to d': d'=(d+0.5r) MOD r. Or the values can be right shifted or left shifted, or a combination thereto. Another option is to string a few spaces together. The ciphertext letter $c_1$ will define a line on the first shared space $S_1$, where it would end with letter $c_2$. $c_2$ will define a line of the second shared space, $S_2$. The last letter on that line will be $c_3$, which in turn will define a LINE on a third shared space $S_3$, and so on until some letter $c_i$ will define a line on space $S_i$, which will end with the plaintext letter p.

Another option is to share a 'master space' where the elements are the distances of the space of the alphabet. The transmitter would choose one of these q=0.5n(n-1) distances as a starting letter in the master space, and thereby will define a permutation of the q distance values. This permutation will then guide the definition of the alphabet space for the current transmission session. This SpaceFlip protocol has the advantage that the transmitter who is aware of the sensitivity of the sent information, can unilaterally decide on the complexity of encryption, without pre-coordinating with the recipient. For more sensitive messages the FIGURE will be more complex. As long as the transmitter communicates the FIGURE with the ciphertext, the recipient will be able to negotiate the message, while the attacker will face a bigger hurdle. The transmitter, upon deciding on a FIGURE, may apply it to all the letters of the alphabet so he can construct a plaintext-ciphertext table ([p]–[c]). The table will tell the transmitter which is the ciphertext letter, [c], that would be used as input to the selected FIGURE in order to generate the desired plaintext letter [p]. Alternatively the transmitter will define a FIGURE with randomly specified (h−1) consecutive LINES, leaving the last h LINE 'open':

$$[p] = \text{FIGURE}([c], t_1, t_2, \ldots t_{h-1}, t_h)$$

Where $t_1, t_2, \ldots t_{h-1}$ are randomized, the ciphertext [c] may also be randomized. The value of $t_h$ is left to be determined. This is done by first determining the outcome of the first (h−1) lines, [e]:

$$[e] = \text{FIGURE}([c], t_1, t_2, \ldots th-1)$$

And then setting:

$$[p] = \text{LINE}([e], t_h)$$

By evaluating this LINE, the transmitter quickly finds the value of $t_h$ that corresponds to the order of [p] in the LINE that starts with [e]. The transmitter then sends the receiver the value of [c] and the h values $t_1, t_2, \ldots t_{h-1}, t_h$, so the transmitter can evaluate the FIGURE on the same space and extract the value of the plaintext letter [p].

The selection of the FIGURE may be according to some plan, or randomized (more secure).

Illustration (Encryption)

For purpose of illustration we select an $n=8=2^3$ alphabet. Accordingly, any plaintext message P will be interpreted as triplets of bits, each triplet representing a letter. We shall build a randomized space as a key:

|     | [1] | [2] | [3] | [4] | [5] | [6] | [7] | [8] |
| --- | --- | --- | --- | --- | --- | --- | --- | --- |
| [1] | 0   | 3   | 5   | 7   | 9   | 11  | 13  | 15  |
| [2] | 3   | 0   | 2   | 4   | 6   | 8   | 10  | 12  |
| [3] | 5   | 2   | 0   | 17  | 19  | 21  | 23  | 25  |
| [4] | 7   | 4   | 17  | 0   | 14  | 16  | 18  | 20  |
| [5] | 9   | 6   | 19  | 14  | 0   | 27  | 1   | 22  |
| [6] | 11  | 8   | 21  | 16  | 27  | 0   | 24  | 26  |
| [7] | 13  | 10  | 23  | 18  | 1   | 24  | 0   | 28  |
| [8] | 15  | 12  | 25  | 20  | 22  | 26  | 28  | 0   |

We can assign: [1]=000, [2]=001, [3]=010, [4]=100, [5]=011, [6]=110, [7]=101, [8]=111 Alice may want to send Bob the plaintext letter [p]=[3] ('010'). She may choose the corresponding ciphertext letter c, to be [c]=[4]. She may decide to connect between [c] and [p] with a FIGURE comprised of two LINES:

$$[3] = F([4], 3, 2) = \text{LINE}([4], 3) \| \text{LINE}(*, t)$$

where t is the integer that needs to be evaluated in order to settle the equation above.

Alice will first evaluate LINE([4],3): The Space, S, indicates that NEXT([4])=[2] since [4,2]=4 the lowest distance. NEXT([2])=[3] since [3,2]=2, and NEXT([3])=[1], since [3,1]=5, which is the lowest distance from [3] when element [2] is excluded. Alice then writes:

$$\text{LINE}([4], 3) = [4][2][3][1]$$

or:

$$F([4], 3, 2) = ([4][2][3][1]) \| \text{LINE}([1], t)$$

Evaluating LINE([1],t): NEXT([1])=[2], since [1,2]=3 is the lowest distance of any element from element [1]. NEXT([2])=[3] because [3,2]=2 is the lowest distance. This resolves the value of: t=2. Alice will then write: LINE([1], 2)=[1][2][3] or:

$$[3] = F([4], 3, 2) = ([4][2][3][1]) \| ([1][2][3])$$

Alice will send Bob the definition of F along with [c]=[4], and Bob, evaluating F on his copy of S will map [c]=[4] into the plaintext letter [p]=[3]. Since there are infinite number of possible geometric FIGURES defined over S, Alice could use a different FIGURE to encrypt each letter in any message, however long, she may wish to send Bob. Suppose Alice wishes to associate plaintext letter e=[7] with ciphertext letter s=[5], using a simple LINE: [7]=LINE([5],t)

Where the variable t needs to be evaluated. Alice will evaluate NEXT([5])=[7] because [5,7]=1. Alice would then wish to associate plaintext letter p=[3] with ciphertext letter c=[6], using a simple LINE: [3]=LINE([6],t)

Alice evaluates: NEXT([6])=[2], NEXT([2])=[3]. so [3]=LINE([6],2) We check another example: [8]=LINE([7], t). NEXT([7])=5, NEXT(5)=[2], NEXT([2])=[3], NEXT([3])=[1], NEXT([1])=[6], NEXT([6])=[4]. NEXT([4])=[8]. Alice writes:

$$[8] = \text{LINE}([7], 8) = [7][5][2][3][1][6][4][8]$$

LINE Cryptography

Alice and Bob may decide to limit the geometric figure to a single line. Let [s], and [e] be any two letters in the chosen alphabet $\{A\}_n$, such that $[s] \neq [e]$, then a LINE starting with [s] will reach [e] after counting t elements from [s], where $1 \leq t_{se} \leq n$. This implies that by sending the other party any letter [s] and the integer $t_{se}$, the recipient party will evaluate [e]=LINE([s],$t_{se}$) via the contents of the shared space, S. Any letter [e] of the alphabet $\{A\}_n$ can be sent with any other letter [s] as the first letter of a LINE such that [e] is the last element of the figure. So per a given space S there are n ways to send each letter. By choosing among these n ways randomly, or otherwise, the transmitter denies any adversary the benefit of frequency analysis. To achieve more variety, the sender may upgrade to two-lines figures, with the first line specified by a fixed count $t_1$. It will now map: [e]=FIGURE([s], $t_1, t_2$)

And will look for the value of $t_2$ that would solve this relationship. There are possible n values for $t_1$, which will add $n^2$ more options to represent any plaintext letter with a respective ciphertext letter. LINE encryption offers some special situations: (1) chain-encryption, and (ii) open-and-secret messaging. The former relates to means to insure integrity of sequence of communication sessions, and the latter is a way to send an open message along with a secret message in one dispatch.

Chain Encryption

Alice wishes to send a message M comprised of l letters of an alphabet $\{A\}_n$: $m_1, m_2, \ldots m_l$. Using a LINE encryption over some space S, Alice matches every letter in M ($m_i$) with a ciphertext letter ($c_i$) and a step-count ($t_i$) that would match that ciphertext letter with the M letter: $m_i = \text{LINE}([c_i], t_i)$:

$$m_i - c_i, t_i \ldots \text{for } i = 1, 2, \ldots l$$

Accordingly Alice will send Bob a stream of twice the size of the encrypted message. Bob will use the stream of $c_i$-$t_i$ to evaluate the message M. Bob will then wish to reply to Alice with message M' comprised of 1 letters: $m'_1$, $m'_2$, ... $m'_l$. He will then evaluate: $m'_i$=LINE([$m_i$],$t'_i$): $m'_i$--$m_i$, $t'_i$ ... for i=1, 2, ... l In other words, Bob will use the message M as the letters for the starting element in the communicated lines. For each $m_i$ and $m'_i$ there is a $t'_i$ that complies with:

$$m'_i=\text{LINE}(m_i, t'_i)$$

Bob will then only pass to Alice the series $t'_1$, $t'_2$, ... $t'_l$. Alice knows M and would readily use this knowledge together with the $t'_i$ values to evaluate M'.

When Alice wishes to send the second message, M'' comprised of $m''_1$, $m''_2$, ... $m''_l$ to Bob she uses the M' letters for the starting elements in the encryption lines, and evaluates series of $t''_i$ values such that: $m'_i$ LINE($m'_i$, $t''_i$) She then sends Bob only the l $t''_i$ values, since Bob is aware of M'. This protocol repeats indefinitely. Accordingly the communication stream is of the size of the message, and the security is enhanced because the adversary only sees the t-values, not the identity of starting elements [s]. This chain-encryption also insures to the parties of the identities of the other through the communication sequence. A stranger that steals in will be at a loss because he would not be aware of the contents of the former message between the parties. This protocol requires all message to be of the same length l. This can be readily accomplished either by parceling out a larger message, or by adding dummy letters to a shorter message.

Steganographic Shadow

In chain-encryption we discussed how an arbitrary text written in letters of a given alphabet $\{A\}_n$ may serve as the list of starting elements (ciphertext letters) in conjunction with LINE count values, to comprise a ciphertext package which is readily decrypted by the intended recipient (aware of the shared key, Space). This fact could be used to send a secret plaintext M, through an open plaintext M' of same length. Each letter of M' will be matched with a LINE count value to map it to the proper M letter. The intended recipient then will read M, in the open, and will decrypt the ciphertext stream to read M'. We may regard M as the open message, and M' as its shadow. There are several circumstances where such a shadow arrangement can be utilized. The t-values can be lumped together and sent as data, or some graphics along the open message M. The t-values can be communicated via a different channel, before, or later and merged with other data. The parties have a built-in deniability, claiming that the open message is what their communication is about, nothing nefarious.

Advanced Deniability:

What if an adversary who sees the open message, also captures the t-values, and now compels the parties to reveal the space they used as key. The parties could then come up with a 'fake secret message' and a 'fake space' that together will map the open message to the fake message and provide mathematical deniability to the parties.

Such 'fake combination' of space and message is likely because the number of possible spaces is much larger than the number of message- and t-values combinations. Regarding the consecutive space, we have (0.5n(n−1))! possible spaces, which is much higher than $n!*n^n$, the number of space and t-values combinations. The larger the size of the alphabet, the easier it is to find a deniability combination of space and secret message.

BEFORE Cryptography

Unlike the LINE which is a straight forward fast function, based on repeat use of the NEXT function, the BEFORE option is much more cumbersome. Yet, it has some unique points of attraction that might render it as the preferred cipher for certain circumstances.

The BEFORE function reverses the NEXT function, and hence for every element [i] in a reference set comprised of n elements we have:

$$[j]=\text{NEXT}([i])$$

$$[i]=\text{BEFORE}([j], h_j)$$

where $h_j$ is a selection integer to be explained right ahead. So elements [i] and [j] can serve as a plaintext letter and a ciphertext letter either way. We can then set a simple substitution cipher where the parties share a space where the elements represent letters of some alphabet. Alice may take any letter of the alphabet [p] as plaintext letter, and encrypt it: [c]=NEXT([p]). Alice will then examine the shared space to list all the letters $y_1$, $y_2$, ... $y_w$ that see letter [c] as their NEXT:

$$[c]=\text{NEXT}([y_1])=\text{NEXT}([y_2])= \ldots \text{NEXT}([y_w])$$

Alice will then identify $[y_i]=[p]$. After that Alice will evaluate a generic metric for all the y values. Say, the centrality index. We recall that the in a centrality mapable, space there are no two elements with the same centrality index, and hence the y-series will be sorted without equivocation. In the resulting ranking $[p]=[y_i]$ stands at rank $h_i$ ($1 \le h_i \le w$). Alice will evaluate $h_i$ from the y-set and pass it along with the ciphertext letter [c] to Bob.

Bob will identify the same y candidates: $y_1$, $y_2$, ... $y_w$ which treat [c] as their NEXT, rank them, as Alice did, and from the value of $h_i$ will find $[y_i]=[p]$ and thereby decrypt the letter from its ciphertext to its plaintext. If Alice wishes to encrypt any of the other (w−1) y-letters, say $[y_j]=[p]$ then it will send Bob the same ciphertext letter along with the different rank count, $h_j$ which Bob will use to correctly encrypt the same letter [c] to a different plaintext letter this time. Bob will encrypt and send ciphertexts and ranking to Alice in a symmetric fashion. Both Alice and Bob can decide unilaterally to increase the amount of encryption by extending single NEXT function to a section of a line (before the inflection point). Alice will wish to better encrypt any plaintext letter [p] by building a line of size r from it: [p],[NEXT([p])], [NEXT(NEXT([p])], ... r times, resulting in letter [c]. Alice will make sure that it applies the BEFORE function into the section of the LINE before the inflection point of the line anchored with [c]. Alice will then evaluate the various letters that would regard [c] as their NEXT, rank them and send Bob the ranking of the letter on the LINE that preceded [c]. Alice will then repeat the same for all the letters of the line from [c] to [p] and send all those rankings to Bob: [c] $h_1$, $h_2$, ... $h_r$.

Bob, in turn will start with [c] and repeat the evaluation Alice carried out, identify the letter on the LINE that precedes [c] by its ranking, as delivered by Alice, and then repeat the same process with that letter to find the letter that is two spots before [c], and so on until Bob identifies [p] and thereby completes the decryption.

THICKLINE/BEFORE Cryptography

The very same mechanism applied to regular LINEs, may be applied to THICKLINEs. Alice will be able to take some u letters and start with them a THICKLINE which would yield a set of u output letters. (same number for input and output letters: u=v). The input letters may be regarded as the plaintext and the output letters may be regarded as ciphertext. Alice will send Bob the ciphertext plus the list of ranking values with which Bob will be able to step back from the ciphertext to the plaintext. This process will encrypt and decrypt u letters together. The problem for encryption is that when Bob works his way back from the ciphertext set to the plaintext set he ends up with a set of v=u letters, but he does not know in what order to put them to fit into the original plaintext. This can be solved with the 'enumeration procedure'. See below. THICKLINE cryptography applies naturally to fixed 'thickness' lines where the size of the plaintext equals to the size of ciphertext. Albeit the very same procedure may be applied both to broadeningLINES (BLINES) (where v>u, more letters in the output set than in the input set), and to ThinningLINEs (TLINES) (where v<u, fewer letters in the output set than in the input set). This prospect seems strange because with a BLINE the ciphertext will be larger than the plaintext (quite common) while for the Thinning-LINE the ciphertext may be much smaller than the plaintext, and yet come with sufficient information to recreate it. We discuss this apparent paradox ahead.

Variable Thickness Lines Cryptography

The mathematical formalism used for THICKLINE can be readily used over Poly* where the number of output letters (v) is different from the number of input letters (u): u≠v. In the case where v>u, the ciphertext appears longer than the plaintext, and in the case where v<u the ciphertext per se is shorter than the plaintext. What balances the bit count is the need for the transmitter to supply to the recipient the ranking indicator for the plaintext. We examine now the length of the ranking indicator. Given an alphabet of size n letters, one can list $\eta = C_n^u$ combinations of u letters. These combinations are mapped to one of the possible $\theta = C_n^v$ combinations of v output letters. So each of the output sets on average will be the Poly* output of $e = \eta/\theta$ sets of u letters input.

$$e = \eta/\theta = v!(n-v)!/u!(n-u)!$$

Indicating that for a fixed thickness case: u=v, e=1. So one would expect that any set of v output letters will be the THICKLINE result of one or two possible input sets. The same applies for all cases where: $|n/2-u|=|n/2-v|$ for an even n, and $|(n+1)/2-u|=|(n+1)/2-v|$ for an odd n. For the cases where $|n/2-u|>|n/2-v|$ we will have e<1 and for the cases where $|n/2-u|<|n/2-v|$ we have e>1

Enumeration Procedure

We consider an alphabet comprised of $2^t$ letters, all expressed in t bits strings. Let M be a message comprised of large number of bits. We plan to encrypt M with a THICKLINE/BEFORE cryptography, using the following THICKLINE:

$$\{y_1, y_2, \ldots y_v\} = \text{THICKLINE}(\{x_1, x_2, \ldots x_u\})$$

We may want to choose integer g such that $2^{g-1}<u$ and $2^g \geq u$. We may then divide the bit stream M to sections, such that each section is (t−g) bits long. We cut out of M u sections of size (t−g) bits. We mark the first section as 1, the second section as 2 etc. Then we write the order of each of the u sections by ordinal numbers, 1, 2, 3, . . . expressed in strings such that each string is g bits long. We have selected g such that this procedure of using g bits to specify the order of each section in the original string will be sufficient to mark the order of all the u letters. We shall concatenate the section of size (t−g) bits chopped from the input string, M, with the g bits marker of the order of each section in the original M. The concatenated string is exactly t bits long. After adding the letter order marker there are u letters to be encrypted through THICKLINE. The respective ciphertext is sent to Bob, along with the ranking integer that properly identifies the plaintext set among all the set that regard the ciphertext set as their Poly* output. Bob then decrypts the ciphertext set to generate at the end the set of u letters of the plaintext. Each letter of the recovered u letters of size t bits each is marked by g bits at its end, where the numerical value of those g bits guides Bob to the original order of the u letters. One could modify the above slightly by adding the order-defining g bits, not necessarily as the markers 1, 2, 3, . . . etc. but as 2, 3, 4 . . . or 3, 4, 5, . . . as long as the order of the letters is well represented. If the total length of the message to be so encrypted is not a multiple of ut then it will be padded with zeroes to make it such a multiple.

Illustration:

Alice wishes to encrypt the following plaintext:

M=01101 11010 00011 11101 01011 11100 00010
10111 10100 11011 0100 11101 01101 11110
10001 10111

Using the following BEFORE:

$$\{y_1, y_2, y_3, y_4, y_5\} = \text{BEFORE}(x_1, x_2, x_3, x_4, x_5)$$

over a space S defined with a reference set comprised of n=256 letters. Each letter is written as a string comprised of t=8 bits. Alice selects g=3 order marking bits because $2^2<u=5$, and $2^3>u=5$.

Alice will chop M into sections of size t−g=8−3=5 bits. The first 5 sections are:

Section 1: 01101
Section 2: 11010
Section 3: 00011
Section 4: 11101
Section 5: 01011

Alice will now mark the order of the sections by adding the strings 001, 010, 011, 100, 101 respectively:

Section 1: 01101 001
Section 2: 11010 010
Section 3: 00011 011
Section 4: 11101 100
Section 5: 01011 101

Thereby resulting in 5 t=8 bits strings, each represents a letter in the reference set alphabet. Alice will encrypt these five letters with the BEFORE function setting: $x_1$: 01101 001 $x_2$: 11010 010 $x_3$: 00011 011 $x_4$: 11101 100 $x_5$: 01011 101 She will then compute the y-series: $\{y_1, y_2, y_3, y_4, y_5\}$ and sent this series to Bob. Bob will use the BEFORE function to decrypt the y-series back to the original x-series. Bob will have no difficulty putting the 5 letters, $x_1, x_2, x_3, x_4, x_5$ in the right order. He will simply organize the letters according to g=3 order marking bits at the end of each letter. Then Bob would chop off the g order marking bits and concatenate the t−g=8−3=5 bits left of each letter according to the order determined by the g bits. Thereby Bob will recover the first 25 bits of M. Alice will repeat the same for the next 25 bits of M, and Bob will repeat his part over the next, and the next 25 bits until Bob acquires the entire M message. Note: If the total length of M is not a multiple of 25 bits, then M will be padded with zeros to make it a multiple of 25 bits.

The Information Content Paradox

We described a cipher which encrypts u letters of an alphabet to v letters of an alphabet, where v may be much smaller than u. Yet the recipient of the v ciphertext letters will regenerate the u plaintext letters. Say a string of 5 letters at plaintext mode will become a single ciphertext letter from which the 5 plaintext letters can be recovered. This appears an information-content paradox. We take the case where the reference set has 256 letter, written as 8 bits long string each letter. Five letters will comprise a 40 bits long string. We now consider a Poly* where u=5, v=1, namely any set of 5 letters is mapped into a single letter. The single letter will be written with 8 bits. Regarding the 5-letter 40 bits string as plaintext, and the output 1 letter, 8 bits long as ciphertext it appears that the information held within arbitrary 40 bits of plaintext is captured in 8 bits of ciphertext. That appears so because the respective BEFORE function will extract the arbitrary 40 bits string from the input of 8 bits string. This apparent 'paradox' is resolved by accounting for the ranking information that must be delivered to the recipient in order to extract the right set of 5 letters. In the above example: we ask how many bits on average will be needed to indicate the ranking of the proper set of 5 plaintext letters. We observe that the reference set is comprised of $n=2^8=256$ letters. There are $s=n!/(5!(n-5)!=256!/(5!*251!)=1,468,258,176$ possible sets of 5 letters in the alphabet. So, on average every letter in the alphabet will be the Poly* output of $s/n=1,468,258,176/256=5,735,384$ 5 letters sets. On average, the rank indicator will point to half that number: 2,867,692, which will require 22 bits to be expressed ($2^{22}=4,194,304$). The above accounting indicates that the transmitter will need to pass to the recipient the Poly* result—an 8 bits letter, plus a 22 bits long ranking indicator, totally 40 bits matching the bit length of the input. Illustration: We regard the following space:

|     | [1] | [2] | [3] | [4] | [5] |
| --- | --- | --- | --- | --- | --- |
| [1] | 0   | 1   | 5   | 7   | 9   |
| [2] | 1   | 0   | 2   | 4   | 6   |
| [3] | 5   | 2   | 0   | 10  | 3   |
| [4] | 7   | 4   | 10  | 0   | 8   |
| [5] | 9   | 6   | 3   | 8   | 0   |

We verify that the space is centrality mapable: C(x) for x=1, 2, 3, 4, 5 is 22, 13, 20, 29, 26 respectively.

We illustrate with PolyA(u=2, v=2). The input letters are [2], and [5]. we examine the distance [x,2]+[x,5] for x=1, 3, 4: 10, 5, 12. We conclude then that PolyA([2], [5])={[1], [3]}

We now need to find all the sets [x]+[y] such that {[1], [3]}=PolyA([x], [y])

| x   | y   | distances  | output   |
| --- | --- | ---------- | -------- |
| [2] | [4] | 8, 12, 14  | [1], [3] |
| [2] | [5] | 10, 5, 12  | [1], [3] |
| [4] | [5] | 16, 10, 13 | [2], [3] |

We conclude that there are two candidates: ([2],[4]), and ([2], [5]). The first set has elements with centrality values: 13, 24. 13 is the lowest. The second set has centrality values of 13, 26. Since the lowest centrality value in both sets is the same, we move to compare the second lowest values. Here the ([2], [4]) has a lower centrality so we rank ([2],[4]) as #1, and ([2],[5]) as #2. We summarize:

{[2],[5]}=BEFORE({[1],[3]},#2) . . . over PolyA

If a transmitter will send a recipient the message BEFORE({[1], [3]}, #2), the recipient, aware of the space, will unequivocally resolve it to {[2], [5]}.

Asymmetric Cryptography

The one-wayness of the Next, Line, Figure, Addition, Multiplication operations may serve as a foundation for asymmetric cryptography. Let [x] and [y] be any two elements in a reference set. Based on the definition of LINE there is an integer t such that:

[y]=LINE([x],t)

And by the same reason there exists an integer t' such that:

[x]=LINE([y],t')

Consequently, there exists a FIGURE such that: [x]=FIGURE([x],t,t')

We can say that t encrypts [x] to [y], and t' encrypts [y] to [x]

Privacy Between Strangers

The procedure known as FigLeaf achieves temporary privacy between strangers based on the "birthday principle". Given a set R comprised of r items, Alice and Bob two strangers subject to full transparency of their communication will be able to achieve temporary privacy, by each randomly selecting q items from R, such that there is a non-negligible probability that Alice and Bob will select the items such that they have one item in common. The FigLeaf protocol calls for Alice and Bob to compare properties of their selected items to learn whether their respective selections of q items have one item in common. The FigLeaf procedure may be carried out over a sufficiently large distance matrix (randomized). The unbound geometry allows Alice and Bob to select properties of their selection as the NEXT, the LINE, or the FIGURE values of their item selection from a reference set. These properties are easy to calculate, and they are very efficient in identifying the shared element, if there is one. Based on the values or r and q Alice and Bob can pre-calculate the probability that there are two distinct elements [x]≠[x]' such that LINE([x],t)=LINE([x'],t). This is the probability that they both have two different elements that have the same property of having the same element as t-element in the LINE function. And if this probability is too high, they can affirm their same selection by checking if their candidates for same selection also satisfy LINE([x],t')=LINE([x'],t') for t≠t'. If necessary they can add a third test or more. These tests will tell Alice and Bob whether they netted by chance one same element. If not, they will repeat the procedure, if yes, they will regard that element as a temporary secret. It is temporary because an adversary can go through all the elements in the reference set and eventually find the shared element. Alice and Bob can use the temporary secret to secure a permanent secret. For example, Bob could use the temporary secret to open a URL in the Internet, place there a permanent secret, which will be erased as soon as Alice took it in.

Procedure:

1. Alice and Bob define a reference set comprised of n=r elements, and populate it randomly in a centrality mapable mode, thereby building the corresponding space, S, which is made public. Alternatively, a third party may build S as a service for Alice and Bob.

2. Alice randomly selects q elements in S, and randomly selects an integer t, then calculates for all the q elements $([x]_1, [x]_2, \ldots [x]_q$ she selected the values of $h_i(t)$=LINE$([x_i],t)$. Alternatively, Alice could select a FIGURE defined with some p parameters $t_1, t_2, \ldots t_p$, compute the corresponding FIGURE: $h_i(t)$=FIGURE$([x_i],t_1, t_2, \ldots t_p)$.

3. Alice passes to Bob the q $h_i(t)$ values, along with the t-parameters used to compute these $h_i$ values.

4. Bob randomly picks elements from S. He discards any element, [y], for which the value of LINE([y],t) is not on the list of q $h_i(t)$ Alice sent him. This way he accumulates q' elements.

5. Bob randomly selects an integer value t' and computes the q' values of LINE$([y]_i,$ t') for all his q' selections: $[y]_1, [y]_2, \ldots [y]_{q'}$. Alternatively Bob may resort to a FIGURE as described for Alice in (2).

6. Bob passes on the q' results to Alice
7. Alice checks her selection for the value of LINE($[x_i]$,t') for i=1, 2, . . . q. She discards any element in her selection that is not on Bob's list. If she ends up with no elements left then Alice and Bob re-start this procedure. If Alice ends up with q">0 elements then she repeats this procedure from step 2 over the smaller set q"<q. If Bob used a FIGURE rather than a line, Alice does the above for these FIGURES.

Alice and Bob continue to send each other, in turn, values of different properties of their selections until they either realize that they have picked no element in common, or until they have a temporary shared secret. If Alice and Bob failed to secure a temporary shared secret they will try again.

Implementation

Cryptographic products based on this algebra of distances (SpaceFlip) are wide ranging implementation wise. The underlying distance matrix (space) may be small or large, depending on the application, and hence it will affect substitution of letters of an alphabet which may be small or large. The matrix offers handling large amounts of data either in software or in hardware. While SpaceFlip technology may rely on large amounts of shared data, it does not use much data for the communication protocol. In fact the transmitted data is close to the size of the communicated message. This is contrast to other ciphers that rely on large keys, but also require large volume of communicated information (e.g. BitFlip). Once a distance matrix is defined, it can easily be modified by agreement of the secret sharing parties. They can agree on shifting the data t steps to the right or to the left, or up and down, and then shift again, any number of times. Such shifting of distances will 'randomly' change the exposed ciphertext. SpaceFlip technology requires very basic computation, so there is no risk of a mathematical shortcut. It only stands to brute force and near brute force attacks, and the respective vulnerability can be readily measured by the users.

Pattern Recognition

The technique to map a traditional continuous multi dimensional space into a dimensionality-free SpaceFlip distance matrix may be applied so that the resultant SpaceFlip matrix may be analyzed with Unbound Geometry functions described herein, and others to discern and extract patterns not visible otherwise. Applications span from face-recognition, landscape navigation, autonomous driving vehicle, robotics, artificial intelligence, and big data. In some application speed of response is crucial. The fast data-to-conclusion reduction offered by SpaceFlip is a great advantage. Pattern recognition in vast amounts of data is carried out via feature extraction. Using SpaceFlip technique a multi dimensional body of data (even continuous data) will be expressed in a size control distance matrix. The matrix will then be used to extract characteristic features. These features can then be compared between two cases, to determine proximity and relationship. The process is then comprised of (i) applying the approximation algorithms described before to map a standard body of data expressed in a multi dimensional space, to a size controlled distance matrix (space). (ii) extracting features from the space (iii) regarding the extracted features as the data signatures of the space, and of the original database, and using those signatures to derive conclusions regarding the analyzed data, and in particular applying these steps to two or more original bodies of data and then comparing the extracted features to decide on similarity or relationship. We address now the feature extraction of a distance matrix Feature Extraction of a Distance Matrix We describe two out of many feature extraction methods. (i) centrality signature, (ii) matrix subtraction, (iii) anchor signature Centrality Signature Given distance matrix over a set N with |N|=n elements, we can assign a centrality metric to every element, and then list all the n elements according to rising centrality (from the most central points to the most external, remote points). This list will define a centrality curve, to be regarded as the centrality signature.

Two or more bodies of data can all be mapped to same size Unbound Geometry space. Each space will be processed to extract its centrality signature. The various centrality signatures will be overlapped and compared. To the extent that they agree, the original database claim data similarity.

Matrix Subtraction

Given two distance matrices, each over a reference set N with n elements: $S_1$ and $S_2$. We will define the $\Delta$ space over $S_1$ and $S_2$, as the distance matrix of same size n where each distance is the absolute value of the difference between the two corresponding distance values on $S_1$ and $S_2$ plus 1 (in order to insure a non-zero distance between two distinct elements of the reference set).

$$\Delta S(S_1,S_2):[i,j]=|[i,j]_1-[i,j]_2|+1 \ldots \text{ for } i \neq j,\, i,j=1,2 \ldots n$$

where $[i,j]_1$ and $[i,j]_2$ are the distance values between elements [i] and [j] in the reference set, per matrices $S_1$ and $S_2$ respectively. The more uniform the $\Delta S$, the greater the affinity between $S_1$, and $S_2$ Illustration: Let $S_1$ be:

|     | [1] | [2] | [3] |
| --- | --- | --- | --- |
| [1] | 0   | 5   | 7   |
| [2] | 5   | 0   | 2   |
| [3] | 7   | 2   | 0   |

And let $S_2$ be:

|     | [1] | [2] | [3] |
| --- | --- | --- | --- |
| [1] | 0   | 4   | 7   |
| [2] | 4   | 0   | 3   |
| [3] | 7   | 3   | 0   |

We then compute:

|     | [1] | [2] | [3] |
| --- | --- | --- | --- |
| [1] | 0   | 2   | 1   |
| [2] | 2   | 0   | 2   |
| [3] | 1   | 2   | 0   |

Anchor Signature

We define an anchor as the first element of an exhaustive space LINE, with regard to that line. We define anchor-ranking of an element on the basis of its ranking in the various LINES of the space. For each element [i] in a reference set N where |N|=n, let $t_j$ be the integer for which [i]=LINE([j],$t_j$). We define the 'anchor-rank' of [i] in the space as:

$$\text{RANK}([i])=\Sigma t_j \ldots \text{ for } j=1,2,\ldots n$$

One can list all the elements in the set according to rising RANK values and thereby create an anchor signature. It is used for analysis and comparison much like the centrality signature.

Glossary

Reference Set: a set of elements (points) that are unidentified except as to their label, and as to their mutual distances.

Distance Between Elements of a Reference Set: ordinal integers—elements that are order-ranked, but with no necessary measure of to what extent a higher-up distance identifying integer is 'higher' than a 'lower' integer.

Distance Matrix: a matrix where the elements of a reference set are listed as both columns and rows, and where the integer stationed at the intersection of row i and column j represents the distance between element i and element j.

Space, Geometry: A Reference Set plus the Distance Matrix that specifies the distances between the elements of the space Unbound Geometry: a geometry (space) where the values of the distances between any two elements of the reference set can be assigned without any restriction owing to the values of the other distances. These 'free distances' may reflect a planned scheme or be randomized.

Centrality of an Element: The sum total of the element distances from all other points in the space.

Consecutive Space: a space S with n elements where the $q=0.5n(n-1)$ distances in the distance matrix are: 1, 2, 3, ... q in some permutation.

A Fully Evolved Space: a space where there are no elements which share the exact same distance values to all other (n−2) elements in the n-elements space.

Centrality Mapable Space (CMS): a space where all the elements have distinct centrality values.

Geometric Functions: Function defined over elements in a reference set, mapping some u elements in the set to a different set of v elements: u,v=1, 2, . . . .

Geometric Alphabet: an alphabet comprised of letters such that each letter is an element of the reference set of a space.

SpaceFlip: a collective name to the unbound geometry, its associated algebra, and the cryptographic tools derived from it.

Nomenclature

Reference set element are usually marked as labels surrounded by square parentheses: ["label"]. The nominal reference to the n elements of a Space is [1], [2], . . . [n]. The distance between element [i] and element [j] is written as [i,j]. A reference set is usually designated as N, where |N|=n, and a space (geometry) is normally designated as S.

What is claimed is:

1. A method utilizing a combination of computing devices, and digital memory devices to enable a secure transmission of information between two or more secret-sharing parties, comprising:
   expressing the secured transmitted information via n distinct information units;
   mapping the n distinct information units onto a shared space;
   defining the shared space via $q=0.5n(n-1)$ mutual distances between the n information units, where a distance is a positive real number;
   transmitting securely, via a transmitter, a set V of v information units by transmitting a different set, U, of u information units, where the sets V and U have no information units in common;
   mapping via a mapping rule the U set of u information units to the V set of v information units, dependent on the shared space q mutual distance values; and
   applying, by an intended recipient of the U set of u information units, the mapping rule to extract the V set of information units from the U set of information units, based on the intended recipient of the U set of information units having knowledge of the shared space q mutual distance values and the mapping rule which are used by the transmitter, and where any other entities without knowledge of the shared space q mutual distance values used by the transmitter are unable to extract the V set of information units from the U set of information units.

2. The method of claim 1, wherein the information units are n letters of a given alphabet A: $a_1, a_2, \ldots a_n$, with one letter of A mapped to another letter of A: |u|=|v|=1, and with the mapping rule from letter $a_i$ to letter $a_j$ (i,j=1, 2, . . . n) comprising:
   $a_j$=NEXT($a_i$), with NEXT being a function pointing to the letter $a_j$, which is the closest to $a_i$, the distance between letter i and letter j, $d_{ij}$, being the smallest among the (n−1) distances $d_{ik}$ for k=1, 2 . . . (i−1),(i+1) . . . n, and if two or more distances have the smallest value, a NEXT equivocation resolution (NER) procedure is applied to select $a_j$.

3. The method of claim 2, wherein the NEXT function is applied t times consecutively, each time it is applied, the NEXT letter selected is among the letters that have not been selected before, resulting in defining a sequence $a_i, a_k, a_l, a_m, \ldots a_j$, where no two letters in the sequence, that are identified as a LINE, are the same; and
   with the NEXT function expressed by $a_j$=LINE($a_i$, t), and having t representing the "length of the line" or "length".

4. The method of claim 3, wherein a LINE operation is applied p times successively, with $a_j$=LINE($a_m$, $t_p$), $a_m$=LINE($a_l$, $t_{p-1}$), and $a_l$=LINE($a_k$, $t_{p-2}$) . . . LINE($a_i$, $t_1$), where the p length values are $t_1, t_2, \ldots t_p$=1, 2, . . . n, and where the LINE operation is written as $a_j$=FIGURE($a_i$, $t_1$, $t_2$, . . . $t_p$).

5. The method of claim 3, wherein two parties sharing a space will prove their identity, a first party Prover to a second party Verifier, by the second party Verifier randomly defining a FIGURE(x, $t_1, t_2, \ldots t_l$), where x is a randomly chosen information unit on the shared space by the first party Prover and the second party Verifier, and $t_1, t_2, \ldots t_l$ are randomly selected integers that define the FIGURE, with the second party Verifier sending the second party Verifier's definition of the FIGURE to the first party Prover; and
   the first party Prover computing an information item y that is the resolution of the second party Verifier's definition of the FIGURE, with y=FIGURE(x, $t_1, t_2, \ldots t_l$), the first party Prover sending the computed information item y to the second party Verifier, the second party Verifier verifying the first part Prover's identity by comparing the received computed information item y with the second party Verifier's known resolution of the FIGURE.

6. The method of claim 2, wherein two distances $d_{ij}$ between any two information units, i≠j, are different, resulting in not performing the (NER) procedure.

7. The method of claim 2, wherein the (NER) procedure comprises the following steps:
   selecting the information unit to be assigned as NEXT for information unit i, where N represents a group of information units separate from information unit i which satisfy the minimum distance requirement from information unit i, by implementing a minimum distance procedure consisting of:
  determining the N information unit that has the smallest distance to its own assigned NEXT information unit,
  selecting as information unit i's NEXT information unit the determined N information unit that has the smallest distance to its own assigned NEXT information unit, and
  in the event a conflict arises due to multiple N information units having the same smallest distance to each information units respective own assigned NEXT information unit, then iteratively repeating the minimum distance procedure starting at the determining step.

8. The method of claim 2, wherein the (NER) procedure comprises the following steps:
  selecting an arbitrary information unit, r, as an "anchor";
  creating a LINE, which defines a particular permutation of the n information units, by applying NEXT to r, (n−1) times; and
  if several information units are candidates as being NEXT to unit i, then the information unit which appears earlier in the permutation of the n information units defined by anchor unit r, is the one selected.

9. The method of claim 3, wherein the n letters are expressed through integers 0 to n−1, and wherein all messages are of the same length of g letters, and all letters are comprised of bit strings of L bits, and where a first message is comprised from g ciphertext letters $c_1, c_2, \ldots c_g$ and corresponding g length values $t_1, t_2, \ldots t_g$, and where an intended recipient of the first message extracts corresponding g plaintext letters $p_1, p_2, \ldots p_g$, by computing $p_i = \text{LINE}(c_i, t_i)$ for $i=1, 2, \ldots g$ on the basis of shared space between a transmitter and the intended recipient of the first message, and where a second message also comprised of g letters, is transmitted as a ciphertext comprised of g ciphertext letters $c'_1, c'_2, \ldots c'_g$, while the corresponding length values $t'_1, t'_2, \ldots t'_g$, are set to be binary values of the g plaintext letters of the first message: $t'_i = |p_i|$ for $i=1, 2, \ldots g$, continued;
  for each successive message the corresponding g length values will be the binary values of the g plaintext letters from the former message.

10. The method of claim 1, wherein v=u+1, where applying the steps of claim 1 with v=u+1, t times, one maps a set of u information units to a set of u+t information units, t=1, 2 . . . .

11. The method of claim 1, wherein v=u−1, where applying the steps of claim 1 with v=u−1, t times, one maps a set of u information units to a set of u-t information units, t=1, 2, . . . (u−1).

12. The method of claim 1, wherein the V set of v information units is selected as v information units, with a sum of u times v, u to v information unit distances, at a minimum, computed as a sum of u to v information unit distances of each member of the V set of v information units to each member of the U set of u information units; and
  if there are two or more choices for the selected V set of v information units, then the V set of v information units of which the multiplication of the u to v information unit distances from each member of the V set of v information units to each member of the U set of u information units, is the maximum value, indicates the selected V set of v information units.

13. The method of claim 1, wherein the V set of v information units is selected as v information units, with a multiplication of u times v, u to v information unit distances, at a maximum, computed as a multiplication of u to v information unit distances of each member of the V set of v information units to each member of the U set of u information units; and
  if there are two or more choices for the selected V set of v information units, then the V set of v information units of which the addition of the u to v information unit distances from each member of the V set of v information units to each member of the U set of u information units, is the minimum value, indicates the selected V set of v information units.

14. The method of claim 1, wherein a bit string comprising n times h bits is parceled out to n segments, $s_1, s_2, \ldots s_n$, each of the n segments comprising h bits each, the first of the n-segments is concatenated with a counter-string $f_1$ comprising d bits where $d \geq \log(n)$, where the binary value interpretation of this counter-string is 0, $f_1 = 0 \ldots 0$, and where the second of the n segments is concatenated with a counter-string, $f_2$, comprising d bits with the binary value interpretation of $f_2$ equal to 1, $f_1 = 0 \ldots 1$, the i-th segment, $i=1, 2, \ldots g$ is concatenated with a counter-string $f_i$ comprising d bits with the binary value interpretation of $f_i$ equal to (i−1), and these n concatenated segments $s_1 \| f_1, s_2 \| f_2, \ldots s_n \| f_n$ form n distinct information units, which are then mapped into a shared space.

* * * * *